United States Patent
Mihara

(10) Patent No.: US 8,446,678 B2
(45) Date of Patent: May 21, 2013

(54) IMAGE FORMING OPTICAL SYSTEM AND ELECTRONIC IMAGE PICKUP APPARATUS EQUIPPED WITH SAME

(75) Inventor: Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 325 days.

(21) Appl. No.: 12/931,480

(22) Filed: Feb. 2, 2011

(65) Prior Publication Data
US 2011/0134266 A1 Jun. 9, 2011

Related U.S. Application Data

(63) Continuation of application No. PCT/JP2009/063323, filed on Jul. 27, 2009.

(30) Foreign Application Priority Data

Aug. 5, 2008 (JP) .................................. 2008-201926

(51) Int. Cl.
*G02B 15/14* (2006.01)
*G02B 15/15* (2006.01)

(52) U.S. Cl.
USPC ........... 359/676; 359/677; 359/679; 359/681; 359/682; 359/685; 359/686; 359/689; 359/691

(58) Field of Classification Search
None
See application file for complete search history.

(56) References Cited

U.S. PATENT DOCUMENTS

| | | | | |
|---|---|---|---|---|
| 6,771,432 B2* | 8/2004 | Mihara | .......................... | 359/687 |
| 6,975,462 B2* | 12/2005 | Mihara | .......................... | 359/687 |
| 7,755,845 B2* | 7/2010 | Yamasaki | ...................... | 359/687 |
| 7,800,830 B2* | 9/2010 | Mihara | .......................... | 359/676 |
| 2007/0014032 A1 | 1/2007 | Otake | | |
| 2008/0080063 A1 | 4/2008 | Katakura et al. | | |
| 2008/0117315 A1 | 5/2008 | Ichikawa et al. | | |
| 2008/0117523 A1 | 5/2008 | Ichikawa et al. | | |

FOREIGN PATENT DOCUMENTS

| | | |
|---|---|---|
| JP | 2000-019395 | 1/2000 |
| JP | 2000-019396 | 1/2000 |
| JP | 2003-098433 | 4/2003 |
| JP | 2003-255228 | 9/2003 |
| JP | 2006-145823 | 6/2006 |
| JP | 2006-330341 | 12/2006 |

(Continued)

OTHER PUBLICATIONS

International Preliminary Report on Patentability, issued in corresponding International Application No. PCT/JP2009/063323, Feb. 17, 2011.

*Primary Examiner* — Scott J Sugarman
*Assistant Examiner* — Robert E Tallman
(74) *Attorney, Agent, or Firm* — Kenyon & Kenyon LLP

(57) ABSTRACT

To provide an image forming optical system that can achieve good correction of chromatic aberration, which is seriously needed particularly when the zoom ratio is high, while achieving slimness and a high zoom ratio and to provide an electronic image pickup apparatus equipped with such an image forming optical system, an image forming optical system has a lens group A including a lens component made up of a positive lens LA and a negative lens LB cemented together and having a negative refracting power as a whole. The lens group A is arranged between a lens group I closest to the object side and an aperture stop. The distance between the lens group I and the lens group A changes for zooming. The lens component has an aspheric cemented surface, and a certain condition concerning the shape of the aspheric surface is satisfied.

19 Claims, 21 Drawing Sheets

FOREIGN PATENT DOCUMENTS

| | | |
|---|---|---|
| JP | 2007-298832 | 11/2007 |
| JP | 2008-083503 | 4/2008 |
| JP | 2008-129458 | 6/2008 |
| JP | 2008-129460 | 6/2008 |

* cited by examiner

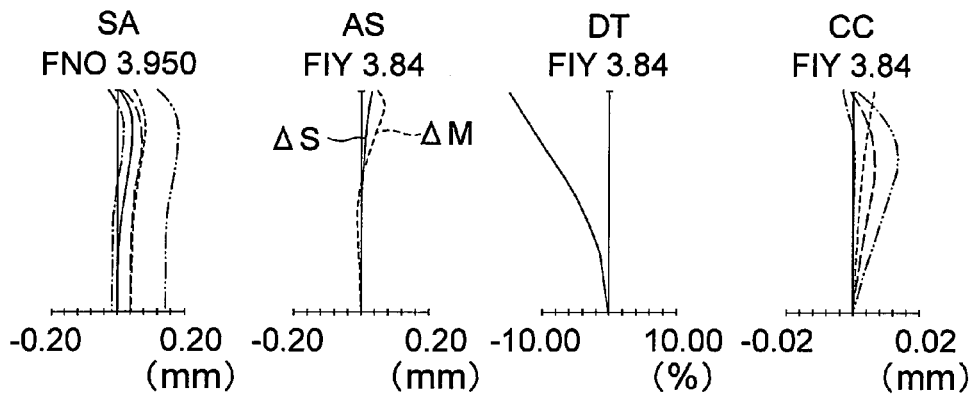
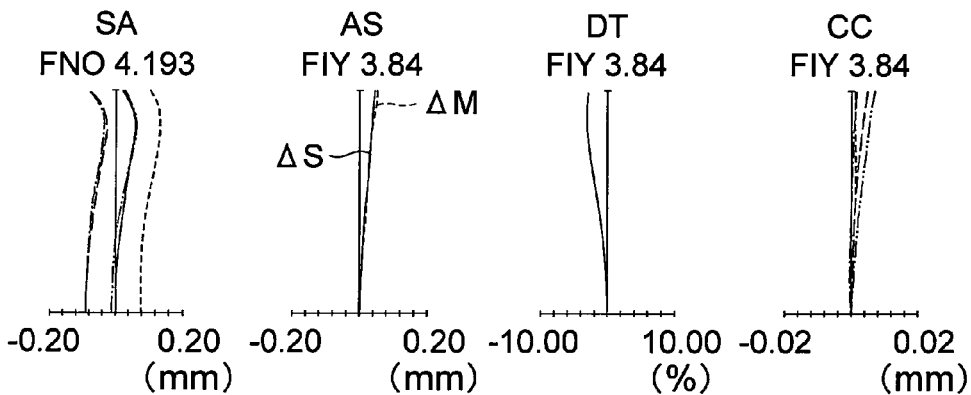
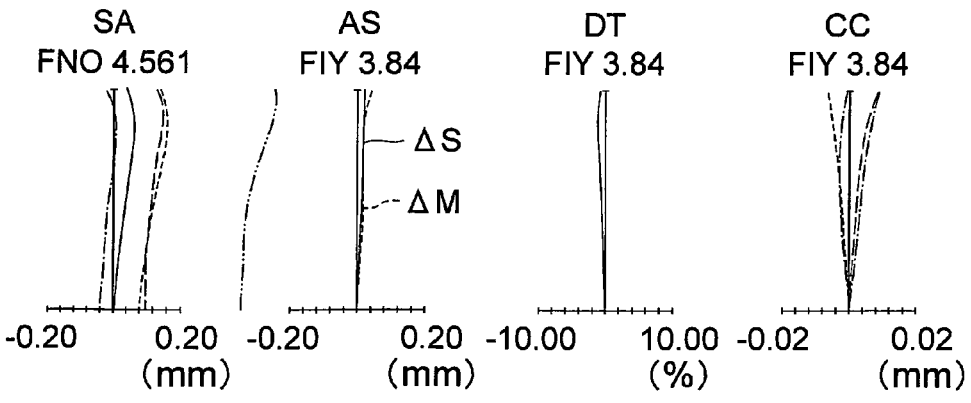

US 8,446,678 B2

IMAGE FORMING OPTICAL SYSTEM AND ELECTRONIC IMAGE PICKUP APPARATUS EQUIPPED WITH SAME

CROSS-REFERENCE TO RELATED APPLICATIONS

This application is a continuation of PCT International Application No. PCT/JP 2009/063323 filed on Jul. 27, 2009, which designates the United States. A claim of priority and the benefit of the filing date under 35 U.S.C. §120 is hereby made to PCT International Application No. PCT/JP2009/063323 filed on Jul. 27, 2009, which in turn claims priority under 35 U.S.C. §119 to Japanese Application No. 2008-201926 filed on Aug. 5, 2008, the entire contents of each of which are expressly incorporated herein in its entirety by reference thereto.

BACKGROUND OF THE INVENTION

1. Field of the Invention

The present invention relates to an image forming optical system (zoom optical system) that has a high zoom ratio and good image forming performance while being slim and is particularly suitable for use as an electronic image pickup optical system, and to an electronic image pickup apparatus equipped with such an image forming optical system.

2. Description of the Related Art

Digital cameras have reached practical levels in terms of large number of pixels (high image quality), compactness, and slimness and replaced 35 mm film cameras from the view points of functions and market. As one aspect of further evolution, a further increase in the number of pixels is strongly desired to be achieved along with an increase in the zoom ratio and an increase in the angle of view while keeping the smallness and slimness as they are.

Zoom optical systems that have been used for their advantage in achieving high zoom ratios include, for example, an optical system disclosed in Patent Document 1. Patent Document 1 discloses what is called a positive-front zoom optical system including, in order from its object side, a first lens group having a positive refracting power, a second lens group having a negative refracting power, a third lens group having a positive refracting power, a fourth lens group having a negative refracting power, and a fifth lens group having a positive refracting power.

This optical system has high image forming performance while having a zoom ratio of 5 to 10 and an F-number at the wide angle end of 2.4.

Patent Document 2 discloses an optical system that is designed to be thin with thinned lens elements and a reduced number of lens components while achieving excellent correction of chromatic aberration. To achieve such an optical system, Patent Document 2 teaches to use a transparent medium having effective dispersion characteristics or partial dispersion characteristics that conventional glasses do not have.

Patent Document 1: Japanese Patent Application Laid-Open No. 2003-255228
Patent Document 2: Japanese Patent Application Laid-Open No. 2006-145823

DISCLOSURE OF THE INVENTION

Problems to be Solved by the Invention

In the design disclosed in Patent Document 1, the thickness of each lens group along the optical axis direction is large. In consequence, it is difficult to make the camera body thin even if a collapsible lens barrel in which the lens barrel unit is housed in the camera body along the thickness (or depth) direction is used. The collapsible lens barrel refers to a lens barrel of a type in which the lens barrel unit is housed in the camera body along the thickness (or depth) direction.

In the design disclosed in Patent Document 2, since the shape and arrangement of the lens made of the transparent medium are not necessarily appropriate, it cannot be said that a sufficient reduction of the thickness of the optical system can be achieved.

The present invention has been made in view of the above-described problems of prior arts, and its object is to provide an image forming optical system that can achieve good correction of chromatic aberration, which is seriously needed particularly when the zoom ratio is high, while achieving slimness and a high zoom ratio and to provide an electronic image pickup apparatus equipped with such an image forming optical system.

Means for Solving the Problems

An image forming optical system according to the present invention that is intended to solve the above problems comprises a lens group I located closest to its object side, an aperture stop, a lens group A disposed between the lens group I and the aperture stop and having a negative refracting power as a whole, wherein the lens group A includes a cemented lens component made up of a positive lens LA and a negative lens LB that are cemented together, the distance between the lens group I and the lens group A on the optical axis changes for the purpose of zooming, the cemented lens component has an aspheric cemented surface, and when the shape of the aspheric surface is expressed by the following equation (1) with a coordinate axis z taken along the optical axis and a coordinate axis h taken along a direction perpendicular to the optical axis:

$$z=h^2/[r[1+\{1-(1+k)(h/r)^2\}^{1/2}]]+A4h^4+A6h^6+A8h^8+A10h^{10}+ \quad (1),$$

where r is the radius of curvature of a spherical component on the optical axis, k is a conic constant, A4, A6, A8, A10, ... are aspheric coefficients, and a deviation is expressed by the following equation (2):

$$\Delta z=z-h^2/[r[1+\{1-(h/r)^2\}^{1/2}]] \quad (2),$$

the following conditional expression (3a) or (3b) is satisfied:

when $R_c \geq 0$, $$\Delta z_C(h) \leq (\Delta z_A(h)+\Delta z_B(h))/2 (\text{where } h=1.2a) \quad (3a),$$

when $R_c \leq 0$, $$\Delta z_C(h) \geq (\Delta z_A(h)+\Delta z_B(h))/2 (\text{where } h=1.2a) \quad (3b),$$

where $z_A$ expresses the shape of the air-contact surface of the positive lens LA according to equation (1), $z_B$ expresses the shape of the air-contact surface of the negative lens LB according to equation (1), $z_C$ expresses the shape of the cemented surface according to equation (1), $\Delta z_A$ is the deviation of the air-contact surface of the positive lens LA according to equation (2), $\Delta z_B$ is the deviation of the air-contact surface of the negative lens LB according to equation (2), $\Delta z_C$ is the deviation of the cemented surface according to equation (2), $R_c$ is the paraxial radius of curvature of the cemented surface, and a is a value expressed by the following equation (4):

$$a=y_{10}^2 \cdot \log_{10} \gamma / fw \quad (4),$$

where $y_{10}$ is the largest image height, fw is the focal length of the entire image forming optical system at the wide angle end, and γ is the zoom ratio (i.e. {the focal length of the entire system at the telephoto end}/{the focal length of the entire system at the wide angle end}) of the image forming optical system, where z(0)=0 holds for all the surfaces because the point of origin is set at the vertex of each surface.

An electronic image pickup apparatus according to the present invention comprises the above-described image forming optical system, an electronic image pickup element, and an image processing unit that processes image data obtained by picking up an image formed through the image forming optical system by the electronic image pickup element and outputs image data representing an image having a changed shape, wherein the image forming optical system is a zoom lens, and the zoom lens satisfies the following conditional expression (17) when the zoom lens is focused on an object point at infinity:

$$0.70 < y_{07}/(f_W \tan \omega_{07w}) < 0.96 \qquad (17),$$

where $y_{07}$ is expressed by equation $y_{07} = 0.7\ y_{10}$, $y_{10}$ being a distance from the center of an effective image pickup area (i.e. an area in which images can be picked up) of the electronic image pickup element to a point farthest from the center within the effective image pickup area (or a largest image height), $\omega_{07w}$ is the angle of the direction toward an object point corresponding to an image point formed at a position at distance $y_{07}$ from the center of the image pickup surface at the wide angle end with respect to the optical axis, and fw is the focal length of the entire image forming optical system at the wide angle end.

Advantageous Effect of the Invention

The present invention can provide an image forming optical system that can achieve good correction of chromatic aberration, which is seriously needed particularly when the zoom ratio is high, while achieving slimness and a high zoom ratio and an electronic image pickup apparatus equipped with such an image forming optical system.

BRIEF DESCRIPTION OF THE DRAWINGS

FIG. 2A is for the wide angle end, FIG. 2B is for the intermediate focal length, and FIG. 2C is for the telephoto end;

FIG. 4A is for the wide angle end, FIG. 4B is for the intermediate focal length, and FIG. 4C is for the telephoto end;

FIG. 6A is for the wide angle end, FIG. 6B is for the intermediate focal length, and FIG. 6C is for the telephoto end;

FIG. 8A is for the wide angle end, FIG. 8B is for the intermediate focal length, and FIG. 8C is for the telephoto end;

FIG. 10A is for the wide angle end, FIG. 10B is for the intermediate focal length, and FIG. 100 is for the telephoto end;

FIG. 12A is for the wide angle end, FIG. 12B is for the intermediate focal length, and FIG. 12C is for the telephoto end;

FIGS. 14A, 14B, and 14C are diagrams showing spherical aberration, astigmatism, distortion, and chromatic aberration of magnification of the zoom lens according to embodiment 7 in the state in which the zoom lens is focused on an object point at infinity, where FIG. 14A is for the wide angle end, FIG. 14B is for the intermediate focal length, and FIG. 14C is for the telephoto end;

FIG. 21A is a front view of the cellular phone 400, FIG. 21B is a side view of the cellular phone 400, and FIG. 21C is a cross sectional view of the taking optical system 405.

DESCRIPTION OF REFERENCE NUMERALS AND SYMBOLS

Figure 1A:
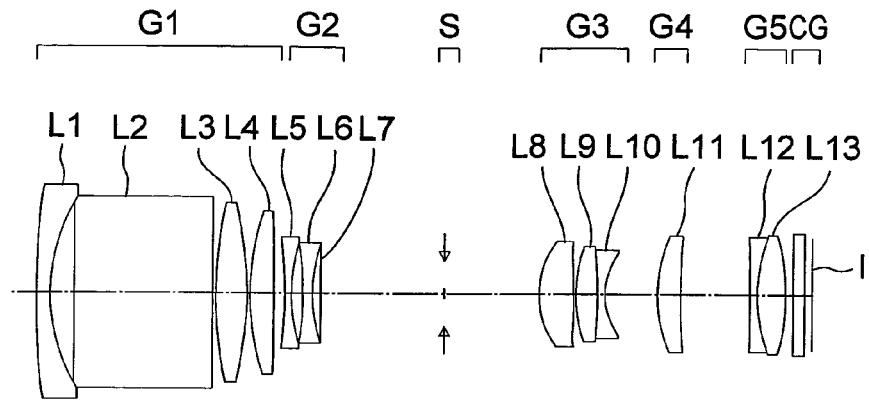
FIGS. 1A, 1B, and 1C are cross sectional views taken along the optical axis showing the optical configuration of a zoom lens according to embodiment 1 of the present invention in the state in which the zoom lens is focused on an object point at infinity, respectively at the wide angle end, at an intermediate focal length, and at the telephoto end.

| | |
|---|---|
| G1: | first lens group |
| G2: | second lens group |
| G3: | third lens group |
| G4: | fourth lens group |
| G5: | fifth lens group |
| G6: | sixth lens group |
| L1-L12: | lens |
| LPF: | low pass filter |
| CG: | cover glass |
| I: | image pickup surface |
| E: | viewer's eye |
| 40: | digital camera |
| 41: | taking optical system |
| 42: | taking optical path |
| 43: | finder optical system |
| 44: | optical path for finder |
| 45: | shutter |
| 46: | flash |
| 47: | liquid crystal display monitor |
| 48: | zoom lens |
| 49: | CCD |
| 50: | image pickup surface |
| 51: | processing unit |
| 53: | objective optical system for finder |
| 55: | Porro prism |
| 57: | field frame |
| 59: | eyepiece optical system |
| 66: | focusing lens |
| 67: | image plane |
| 100: | objective optical system |
| 102: | cover glass |
| 162: | electronic image pickup element chip |
| 166: | terminal |
| 300: | personal computer |
| 301: | keyboard |
| 302: | monitor |
| 303: | taking optical system |
| 304: | taking optical path |
| 305: | image |
| 400: | cellular phone |
| 401: | microphone portion |
| 402: | speaker portion |
| 403: | input dial |
| 404: | monitor |

-continued

| | |
|---|---|
| 405: | taking optical system |
| 406: | antenna |
| 407: | taking optical path |

DETAILED DESCRIPTION OF THE INVENTION

Prior to the description of embodiments, operations and effects of an image forming optical system according to one mode will be described.

In order to make an optical system thin, a reduction of the total optical length is required. If a reduction in the total optical length and a high zoom ratio are both to be achieved, high order components of chromatic spherical aberration and chromatic aberration of magnification with respect to the image height tend to be large. In conventional optical systems, correction of these aberrations has been difficult. Even if spherical aberration is well corrected at a reference wavelength, the presence of chromatic spherical aberration will lead to undercorrection or overcorrection at other wavelengths.

In view of this, the image forming optical system according to this mode comprises a lens group I disposed closest to the object side, an aperture stop, and a lens group A disposed between the lens group I and the aperture stop and having a negative refracting power as a whole, wherein the lens group A includes a cemented lens component in which a positive lens LA and a negative lens LB are cemented together, the distance between the lens group I and the lens group A on the optical axis changes for zooming, and the cemented lens component has an aspheric cemented surface. Here, a positive lens refers to a lens having a positive paraxial focal length, and a negative lens refers to a lens having a negative paraxial focal length.

In the image forming optical system according to this mode, the use of an aspheric surface as the cemented surface of the cemented lens component enables excellent correction of chromatic spherical aberration and chromatic aberration of magnification. The ray height of rays passing through the optical system becomes largest in the lens group A, in particular at the wide angle end. Therefore, the use of the cemented lens component in the lens group A can make it easy to correct high order components of chromatic aberration of magnification with respect to the image height at the wide angle end.

However, it is difficult to achieve satisfactory correction of chromatic spherical aberration and chromatic aberration of magnification only by designing a cemented surface simply as an aspheric surface. In other words, what is important in order to achieve satisfactory correction of chromatic spherical aberration and chromatic aberration of magnification is the shape of the aspheric surface. Referring to high order components of chromatic aberration with respect to the image height at the wide angle end, if there are such high order components, the high order components at a short wavelength (e.g. the g-line) have values on the negative side of those at a reference wavelength (e.g. the d-line) at a positive intermediate image height and have values on the positive side of those at the reference wavelength at the positive largest image height. Therefore, in order to correct such high order components, a cemented surface providing an achromatic effect should be designed to have a surface curvature in such a direction that decreases the achromatic effect at positions corresponding to principal rays of higher image heights.

Specifically, the shape of the aspheric surface is expressed by the following equation (1) with a coordinate axis z taken along the optical axis and a coordinate axis h taken along a direction perpendicular to the optical axis:

$$z = h^2/[r[1+\{1-(1+k)(h/r)^2\}^{1/2}]] + A4h^4 + A6h^6 + A8h^8 + A10h^{10} + \quad (1),$$

where r is the radius of curvature of a spherical component on the optical axis, k is a conic constant, A4, A6, A8, A10, ... are aspheric coefficients, and the deviation is expressed by the following equation (2):

$$\Delta z = z - h^2/[r[1+\{1-(h/r)^2\}^{1/2}]] \quad (2),$$

then it is preferred that the following conditional expression (3a) or (3b) be satisfied:

when $R_c \geq 0$, $$\Delta z_C(h) \leq (\Delta z_A(h) + \Delta z_B(h))/2 \text{ (where } h = 1.2a) \quad (3a),$$

when $R_c \leq 0$, $$\Delta z_C(h) \geq (\Delta z_A(h) + \Delta z_B(h))/2 \text{ (where } h = 1.2a) \quad (3b),$$

where $z_A$ expresses the shape of the air-contact surface of the positive lens LA according to equation (1), $z_B$ expresses the shape of the air-contact surface of the negative lens LB according to equation (1), $z_C$ expresses the shape of the cemented surface according to equation (1), $\Delta z_A$ is the deviation of the air-contact surface of the positive lens LA according to equation (2), $\Delta z_B$ is the deviation of the air-contact surface of the negative lens LB according to equation (2), $\Delta z_C$ is the deviation of the cemented surface according to equation (2), $R_c$ is the paraxial radius of curvature of the cemented surface, and a is a value expressed by the following equation (4):

$$a = y_{10}^2 \cdot \log_{10} \gamma / fw \quad (4)$$

where $y_{10}$ is the largest image height, fw is the focal length of the entire image forming optical system at the wide angle end, and γ is the zoom ratio (i.e. {the focal length of the entire system at the telephoto end}/{the focal length of the entire system at the wide angle end}) of the image forming optical system. Since the point of origin is set at the vertex of each surface, z(0)=0 holds for all the surfaces.

If conditional expressions (3a), (3b) are not satisfied, the aspheric surface in the cemented surface cannot provide an advantageous effect. Conversely, if the above-described features and conditions are satisfied, it is possible to achieve correction of chromatic aberration, which can be generated greatly with size reduction and slimming. Therefore, image forming performance can be maintained or improved. When the conditions concerning dispersion characteristics of the material that will be described later are satisfied, chromatic aberration can be corrected more effectively.

It is preferred that the difference between the dispersion of the positive lens LA and the dispersion of the negative lens LB be not smaller than 10. It is more preferred that the difference be not smaller than 20. It is still more preferred that the difference be not smaller than 30. The positive lens LA has a higher dispersion than the negative lens LB.

In the image forming optical system according to this mode, the value of θgF and the value of vd of the positive lens LA fall within the following two ranges: the range in an orthogonal coordinate system having a horizontal axis representing vd and a vertical axis representing θgF that is bounded by the straight line given by the equation θgF=α×vd+β(where α=−0.00163) into which the lowest value of β in the range defined by the following conditional expression (5) is substituted and the straight line given by the equation θgF=α×vd+β (where αhg1=−0.00163) into which the highest value of β in the range defined by the following conditional expression (5) is substituted; and the range defined by the following conditional expression (6):

$$0.6700 < \beta < 0.9000 \quad (5),$$

$$3 < vd < 27 \quad (6),$$

where θgF is the relative partial dispersion (ng−nF)/(nF−nC) of the positive lens LA, and vd is the Abbe constant (nd−1)/(nF−nC) of the positive lens LA, where nd, nC, nF, and ng are refractive indices of the positive lens LA for the d-line, C-line, F-line, and g-line respectively.

If the lower limit of conditional expression (5) is exceeded, correction of axial chromatic aberration by secondary spectrum, specifically, correction of axial chromatic aberration with respect to the g-line while achromatism is achieved with respect to the F-line and the C-line will be insufficient. Therefore, it will be difficult to achieve sharpness in picked-up images. If the upper limit of conditional expression (5) is exceeded, overcorrection of axial chromatic aberration by secondary spectrum will result. In consequence, it will be difficult to achieve sharpness in picked-up images, as in the case where the lower limit is exceeded.

If either the lower limit or the upper limit of conditional expression (6) is exceeded, even achromatism with respect to F-line and the C-line will be difficult. In addition, variations in chromatic aberration during zooming will be large. Therefore, it is difficult to achieve sharpness in picked up images.

It is more preferred that the following conditional expression (5') be satisfied instead of the above conditional expression (5):

$$0.6850 < \beta < 0.8700 \quad (5').$$

It is still more preferred that the following conditional expression (5") be satisfied instead of the above conditional expression (5):

$$0.7000 < \beta < 0.8500 \quad (5'').$$

In the image forming optical system according to this mode, the value of θhg and the value of vd of the positive lens LA fall within the following two ranges: the range in an orthogonal coordinate system having a horizontal axis representing vd and a vertical axis representing θhg that is bounded by the straight line given by the equation θhg=αhg×vd+βhg (where αhg=−0.00225) into which the lowest value of βhg in the range defined by the following conditional expression (7) is substituted and the straight line given by the equation θhg=αhg×vd+βhg (where αhg=−0.00225) into which the highest value of βhg in the range defined by the following conditional expression (7) is substituted; and the range defined by the following conditional expression (6):

$$0.6350 < \beta hg < 0.9500 \quad (7),$$

$$3 < vd < 27 \quad (6),$$

where θhg is the relative partial dispersion (nh−ng)/(nF−nC) of the positive lens LA, and nh is the refractive index of the positive lens LA for the h-line.

If the lower limit of conditional expression (7) is exceeded, correction of axial chromatic aberration by secondary spectrum, specifically, correction of axial chromatic aberration with respect to the h-line while achromatism is achieved with respect to the F-line and the C-line will be insufficient. Therefore, purple color flare and color blur will tend to occur in picked-up images. If the upper limit of conditional expression (7) is exceeded, overcorrection of axial chromatic aberration by secondary spectrum will result. In consequence, purple color flare and color blur will tend to occur in picked-up images, as in the case where the lower limit is exceeded.

It is more preferred that the following conditional expression (7') be satisfied instead of the above conditional expression (7):

$$0.6500 < \beta hg < 0.9200 \qquad (7').$$

It is still more preferred that the following conditional expression (7") be satisfied instead of the above conditional expression (7):

$$0.6650 < \beta hg < 0.9000 \qquad (7'').$$

It is preferred that the image forming optical system according to this mode satisfy the following conditional expression (8):

$$0.0700 \leq \theta gF(LA) - \theta gF(LB) \leq 0.5000 \qquad (8),$$

where θgF (LA) is the relative partial dispersion (ng−nF)/(nF−nC) of the lens LA, and θgF(LB) is the relative partial dispersion (ng−nF)/(nF−nC) of the lens LB.

When this is the case, since a positive lens (or lens LA) and a negative lens (or lens LB) are used in combination, good correction of chromatic aberration can be achieved. In particular, if the above-described conditions are satisfied with this combination, the effect of correcting axial chromatic aberration caused by secondary spectrum will be excellently achieved, resulting in an improvement in sharpness of images.

It is more preferred that the following conditional expression (8') be satisfied instead of the above conditional expression (8):

$$0.0900 \leq \theta gF(LA) - \theta gF(LB) \leq 0.4000 \qquad (8').$$

It is most preferred that the following conditional expression (8") be satisfied instead of the above conditional expression (8):

$$0.1250 \leq \theta gF(LA) - \theta gF(LB) \leq 0.3000 \qquad (8'').$$

It is also preferred that the image forming optical system according to this mode satisfy the following conditional expression (9):

$$0.1000 \leq \theta hg(LA) - \theta hg(LB) \leq 0.60 \qquad (9),$$

where θhg (LA) is the relative partial dispersion (nh−ng)/(nF−nC) of the lens LA, and θhg(LB) is the relative partial dispersion (nh−ng)/(nF−nC) of the lens LB.

When this is the case, since a positive lens (or lens LA) and a negative lens (or lens LB) are used in combination, good correction of chromatic aberration can be achieved. In particular, if the above-described conditions are satisfied with this combination, color flare and color blur can be reduced.

It is more preferred that the following conditional expression (9') be satisfied instead of the above conditional expression (9):

$$0.1350 \leq \theta hg(LA) - \theta hg(LB) \leq 0.55 \qquad (9').$$

It is most preferred that the following conditional expression (9") be satisfied instead of the above conditional expression (9):

$$0.1800 \leq \theta hg(LA) - \theta hg(LB) \leq 0.50 \qquad (9'').$$

It is also preferred that the image forming optical system according to this mode satisfy the following conditional expression (10):

$$\nu d(LA) - \nu d(LB) \leq -16 \qquad (10),$$

where νd (LA) is the Abbe constant (nd−1)/(nF−nC) of the lens LA, and νd(LB) is the Abbe constant (nd−1)/(nF nC) of the lens LB.

When this is the case, since a positive lens (or lens LA) and a negative lens (or lens LB) are used in combination, good correction of chromatic aberration can be achieved. In particular, if the above-described conditions are satisfied with this combination, cancellation of axial chromatic aberration and chromatic aberration of magnification with respect to the C-line and the F-line is facilitated.

It is more preferred that the following conditional expression (10') be satisfied instead of the above conditional expression (10):

$$\nu d(LA) - \nu d(LB) \leq -25 \qquad (10').$$

It is most preferred that the following conditional expression (10") be satisfied instead of the above conditional expression (10):

$$\nu d(LA) - \nu d(LB) \leq -34 \qquad (10'').$$

When the image forming optical system is a zoom lens, in order to achieve a high zoom ratio and slimness of the zoom lens at the same time, it is necessary that the lens group A have a high negative refracting power. Therefore, it is preferred that the optical material used for the positive lens LA have a somewhat low refractive index nd(LA) for the d-line. Specifically, it is preferred that the image forming optical system according to this mode satisfy the following conditional expression (11):

$$1.55 \leq nd(LA) \leq 1.90 \qquad (11),$$

where nd(LA) is the refractive index of the positive lens LA for the d-line.

Exceeding the upper limit of conditional expression (11) will tend to be disadvantageous in achieving slimming. Exceeding the lower limit of conditional expression (11) will make it difficult to achieve good correction of astigmatism.

It is more preferred that the following conditional expression (11') be satisfied instead of the above conditional expression (11):

$$1.60 \leq nd(LA) \leq 1.80 \qquad (11').$$

It is most preferred that the following conditional expression (11") be satisfied instead of the above conditional expression (11):

$$1.63 \leq nd(LA) \leq 1.75 \qquad (11'')$$

It is also preferred that the image forming optical system according to this mode satisfy the following conditional expression (12):

$$1.52 \leq nd(LB) \leq 2.4 \qquad (12),$$

where nd(LB) is the refractive index of the negative lens LB for the d-line.

Exceeding the lower limit of conditional expression (12) will tend to be disadvantageous in achieving slimming. Exceeding the upper limit of conditional expression (12) will make it difficult to achieve good correction of astigmatism.

It is more preferred that the following conditional expression (12') be satisfied instead of the above conditional expression (12):

$$1.58 \leq nd(LB) \leq 2.30 \qquad (12').$$

It is most preferred that the following conditional expression (12") be satisfied instead of the above conditional expression (12):

$$1.67 \leq nd(LB) \leq 2.20 \qquad (12'')$$

In cases where conditional expressions (11) and (12), conditional expressions (11') and (12'), or conditional expressions (11") and (12") are satisfied, if the difference between the refractive index of the positive lens LA for the d-line and the refractive index of the negative lens LB for the d-line, or the difference in the refractive indices across the cemented surface is designed to be equal to or lower than 0.3, high order chromatic aberration components can be corrected without deterioration of aberrations with respect to a reference wavelength such as the d-line.

It is difficult to realize an optical material satisfying conditional expressions (5) and (6) using an optical glass. On the other hand, an optical material satisfying conditional expressions (5) and (6) can be realize easily by using an organic material such as a resin or an organic material in which inorganic fine particles are diffused to change optical characteristics. Therefore, it is preferred that an optical material satisfying conditional expressions (5) and (6) be a material containing an organic material such as a resin.

When the aforementioned organic material is used as the optical material for the positive lens LA, it is preferred that the positive lens LA be made as thin as possible. To this end, it is preferred that the material of the positive lens LA be an energy curable resin. In addition, it is preferred that the cemented lens component be produced by molding the positive lens LA directly on the negative lens LB.

Specifically, an energy curable resin is firstly discharged onto an optical surface of the negative lens LB. Then, the energy curable resin that is in contact with the optical surface of the negative lens LB is extended thereon. Thereafter, the energy curable resin is cured. The cemented lens component is produced by forming the lens LA in this way. In connection with this, surface processing (e.g. coating) may be applied on the lens LB beforehand. A material different from the material of which the lens LB is made is used for this surface processing. Examples of the energy curable resin include an ultraviolet curable resin and a composite material in which inorganic fine particles such as $TiO_2$ fine particles are diffused in an ultraviolet curable resin.

With the above-described method of producing the cemented lens component, the cemented surface can easily be made aspheric. In the above-described case, an aspheric cemented surface is produced with materials (mediums) having different Abbe constants and relative partial dispersions. Such an aspheric surface is advantageous in correcting high order components of chromatic aberration of magnification with respect to the image height and high order chromatic aberration components such as chromatic coma and chromatic spherical aberration, unlike with the case of aspheric surfaces used as normal air-contact surfaces that are exposed to the air.

In particular, in the configuration in which the lens group A having a negative refracting power is disposed closer to the object side than the aperture stop, it is preferred that the cemented surface in the lens group A be an aspheric surface. When this is the case, satisfying the above-described conditional expression (3a) or (3b) can provide a significant effect in correcting high order components of chromatic aberration of magnification with respect to the image height at wide angle focal lengths and chromatic coma. In the configuration in which there is another lens group disposed closer to the object side than the lens group A, it is particularly preferred that this another lens group have a positive refracting power. If this is the case, the above-described correction effect will be prominent. It is still more preferred that one or more of the conditions stated by conditional expressions (5) to (12) be satisfied.

It is preferred that the image forming optical system according to this mode satisfy the following conditional expression (13):

$$0.05 \leq |z_A(h) - z_C(h)|/tA \leq 0.95 \text{ (when } h=1.2a\text{)},$$

where to is the thickness of the positive lens LA on the optical axis, and $z(0)=0$ holds in any case.

If the lower limit of conditional expression (13) is exceeded, correction of chromatic aberration will tend to be insufficient. If the upper limit of conditional expression (13) is exceeded, it will be difficult to keep an adequate thickness in the peripheral region of the lens when making the positive lens thin.

It is more preferred that the following conditional expression (13') be satisfied instead of the above conditional expression (13):

$$0.10 \leq |z_A(h) - z_C(h)|/tA \leq 0.90 \qquad (13').$$

It is most preferred that the following conditional expression (13") be satisfied instead of the above conditional expression (13):

$$0.20 \leq |z_A(h) - z_C(h)|/tA \leq 0.80 \qquad (13").$$

It is also preferred that the image forming optical system according to this mode satisfy the following conditional expression (14):

$$0.3 \leq tA/tB \leq 1.4 \qquad (14),$$

where tB is the thickness of the negative lens LB on the optical axis.

In the image forming optical system according to this mode, it is preferred that the cemented lens component made up of the positive lens LA and the negative lens LB that are cemented together be arranged in one of the following manners (A1), (A2), and (A3). When this is the case, correction of chromatic aberration, a high zoom ratio, and correction of astigmatism can all be achieved at high levels.

(A1) Arranging the cemented lens component as the component located closest to the object side in the lens group A to provide a negative refracting power and arranging at least one positive lens on the image side of the cemented lens component.

(A2) Arranging a negative single lens as the component located closest to the object side in the lens group A and arranging the cemented lens component immediately on the image side of the negative single lens.

(A3) Arranging the cemented lens component as the component located closest to the image side in the lens group A.

It is preferred that the image forming optical system consist of one of the following sets (B1) to (B6) of lens groups including lens groups subsequent to the lens group A. In each set, these lens groups are arranged in order succeeding the lens group A.

(B1) The image forming optical system consists of four lens groups in total including a lens group G3 having a positive refracting power and a lens group G4 having a positive refracting power that are arranged subsequent to the lens group A.

(B2) The image forming optical system consists of four lens groups in total including a lens group G3 having a negative refracting power and a lens group G4 having a positive refracting power that are arranged subsequent to the lens group A.

(B3) The image forming optical system consists of four lens groups in total including a lens group G3 having a positive refracting power and a lens group G4 having a negative refracting power that are arranged subsequent to the lens group A.

(B4) The image forming optical system consists of five lens groups in total including a lens group G3 having a positive refracting power, a lens group G4 having a positive refracting power, and a lens group G5 having a negative refracting power that are arranged subsequent to the lens group A.
(B5) The image forming optical system consists of five lens groups in total including a lens group G3 having a positive refracting power, a lens group G4 having a negative refracting power, and a lens group G5 having a positive refracting power that are arranged subsequent to the lens group A.
(B6) The image forming optical system consists of five lens groups in total including a lens group G3 having a positive refracting power, a lens group G4 having a positive refracting power, and a lens group G5 having a positive refracting power that are arranged subsequent to the lens group A.

In any configuration, it is preferred that the lens group I be disposed closest to the object side and the lens group I have a reflecting optical element. The reflecting optical element is used to bend rays that contribute to imaging. This facilitates a reduction in the depth of the optical system.

In the following, correction of distortion by image processing will be described in detail. Suppose that an image of an object at infinity is formed by an optical system free from distortion. In this case, since the image has no distortion, the following equation holds:

$$f = y/\tan \omega \qquad (15).$$

Here, y is the height of the image point from the optical axis, f is the focal length of the imaging optical system, ω is the angle of direction toward an object point corresponding to an image point formed at a position at distance y from the center of the image pickup surface with respect to the optical axis.

On the other hand, if an optical system is allowed to have barrel distortion only at focal length positions near the wide angle end, the following inequality holds:

$$f > y/\tan \omega \qquad (16).$$

This means that if ω and y are constant values, the focal length f at the wide angle end may be long, and accordingly aberration correction can be achieved easily. The reason why the lens group constituting the aforementioned lens group A is normally composed of two or more lens components is to achieve correction of both distortion and astigmatism. Since this is not necessary in the present invention, this lens group may be composed only of one lens component, which can be made thin.

In view of the above, the electronic image pickup apparatus according to the present invention is adapted to process image data obtained through the electronic image pickup element by image processing. In this processing, the image data (or the shape of the image) is transformed in such a way as to correct barrel distortion. Thus, image data finally obtained will be image data having a shape substantially similar to the object. Therefore, an image of the object may be output to a CRT or a printer based on this image data.

The electronic image pickup apparatus according to this mode has an electronic image pickup element and an image processing unit that processes image data obtained by picking up an image formed through an image forming optical system, which is a zoom lens, by the electronic image pickup element and outputs image data representing an image having a transformed shape. It is preferred that the zoom lens satisfy the following conditional expression (17) when it is focused on an object point substantially at infinity:

$$0.70 < y_{07}/(f_w \cdot \tan \omega_{07w}) < 0.96 \qquad (17),$$

where $y_{07}$ is expressed by equation $y_{07} = 0.7 \, y_{10}$, $y_{10}$ being the largest image height, and $\omega_{07w}$ is the angle of the direction toward an object point corresponding to an image point formed at a position at distance $y_{07}$ from the center of the image pickup surface at the wide angle end with respect to the optical axis. In the case of the electronic image pickup apparatus according to this mode, the largest image height is equal to the distance from the center of the effective image pickup area (i.e. the area in which images can be picked up) of the electronic image pickup element to the point farthest from the center within the effective image pickup area. Therefore, $y_{10}$ also is the distance from the center of the effective image pickup area (i.e. an area in which images can be picked up) of the electronic image pickup element to the point farthest from the center within the effective image pickup area.

The above conditional expression (17) specifies the degree of barrel distortion at the wide angle end zoom position. If conditional expression (17) is satisfied, correction of astigmatism can be achieved without difficulty. An image having barrel distortion is photo-electrically converted by the image pickup element into image data having barrel distortion.

However, in the image processing unit, which is a signal processing system of the electronic image pickup apparatus, the image data having barrel distortion is subject to the electrical processing of changing the shape of the image. Thus, when the image data finally output from the image processing unit is reproduced on a display apparatus, distortion has been corrected, and an image substantially similar to the shape of the object is obtained.

If the term in conditional expression (17) has a value larger than the upper limit of conditional expression (17), in particular if it has a value close to 1, an image that is excellently corrected optically in terms of distortion can be obtained. Therefore, correction made by the image processing unit may be small. However, this is not advantageous for correction of astigmatism.

On the other hand, if the lower limit of conditional expression (17) is exceeded, the extension ratio in radial directions in the processing of correcting image distortion caused by distortion of the optical system by the image processing unit will become unduly high in the peripheral region of the angle of view. In consequence, deterioration of sharpness in the peripheral region of picked-up images will become conspicuous.

Satisfying conditional expression (17) facilitates excellent correction of astigmatism, enabling slimming of the optical system and a large aperture ratio (i.e. an F-number smaller than 2.8 at the wide angle end).

It is more preferred that the following conditional expression (17') be satisfied instead of the above conditional expression (17):

$$0.73 < y_{07}/(f_w \cdot \tan \omega_{07w}) < 0.945 \qquad (17').$$

It is still more preferred that the following conditional expression (17") be satisfied instead of the above conditional expression (17):

$$0.76 < y_{07}/(f_w \cdot \tan \omega_{07w}) < 0.935 \qquad (17").$$

Figure 1B:
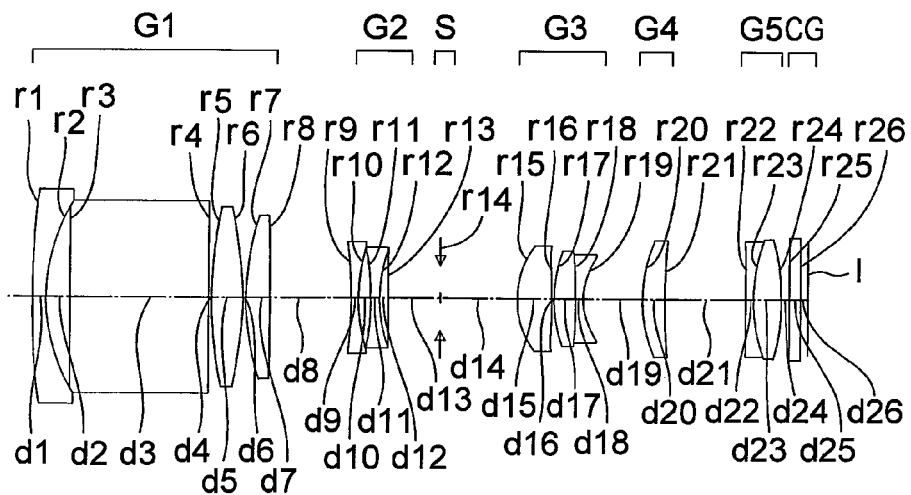
Figure 1C:
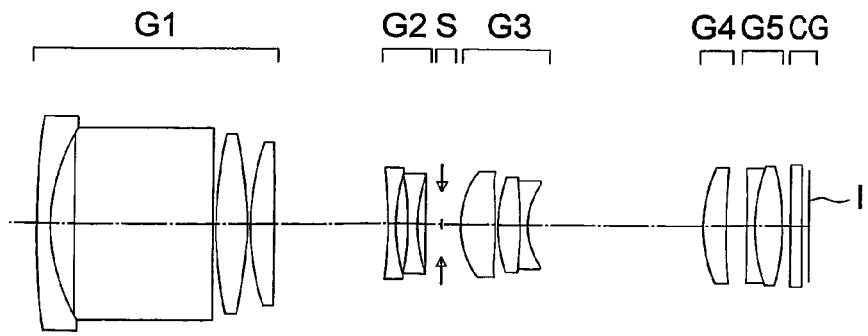

Now, a zoom lens according to embodiment 1 of the present invention will be described. FIGS. 1A, 1B, and 1C are cross sectional views taken along the optical axis showing the optical configuration of the zoom lens according to embodiment 1 of the present invention in the state in which the zoom lens is focused on an object point at infinity, where FIG. 1A is a cross sectional view of the zoom lens at the wide angle end, FIG. 1B is a cross sectional view of the zoom lens at an intermediate focal length position, and FIG. 1C is a cross sectional view of the zoom lens at the telephoto end.

Figure 2A:
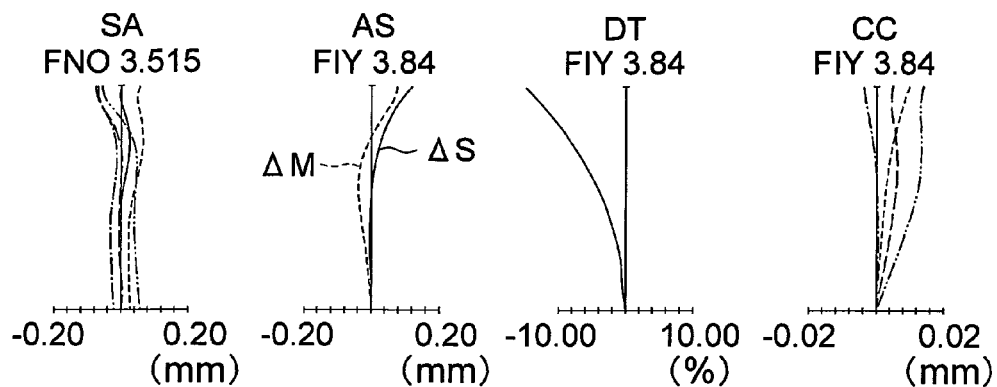
FIGS. 2A, 2B, and 2C are diagrams showing spherical aberration, astigmatism, distortion, and chromatic aberration of magnification of the zoom lens according to embodiment 1 in the state in which the zoom lens is focused on an object point at infinity, where
Figure 2B:
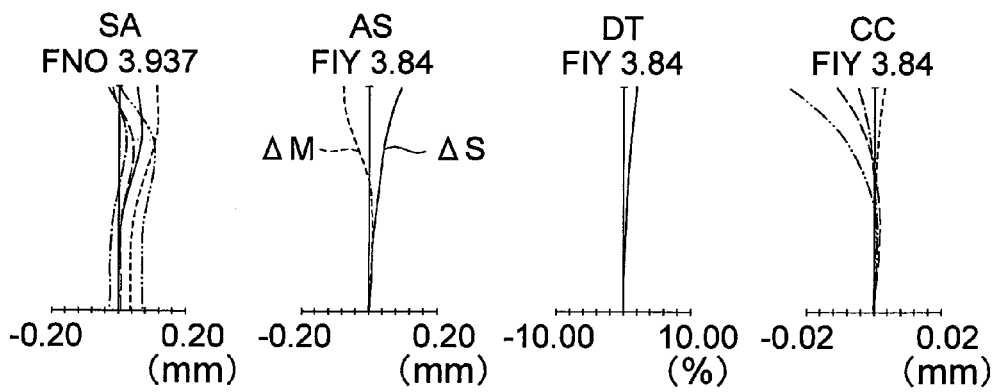
Figure 2C:
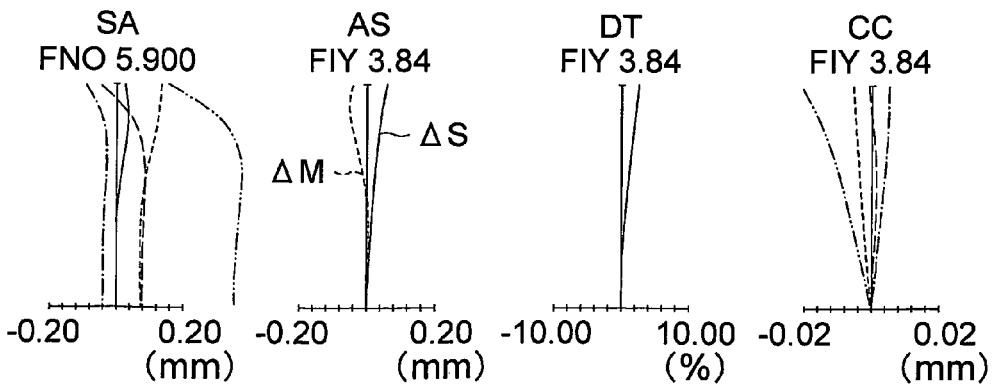

FIGS. 2A, 2B, and 2C are diagrams showing spherical aberration (SA), astigmatism (AS), distortion (DT), and chromatic aberration of magnification (CC) of the zoom lens according to embodiment 1 in the state in which the zoom lens is focused on an object point at infinity, where FIG. 2A is for the wide angle end, FIG. 2B is for the intermediate focal length position, and FIG. 2C is for the telephoto end. Sign "FIY" represents the image height. The signs in the aberration diagrams are commonly used also in the embodiments described in the following.

As shown in FIGS. 1A, 1B, and 1C, the zoom lens according to embodiment 1 includes, in order from its object side, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a negative refracting power. In the cross sectional views of the lenses according to this and all the embodiments described in the following, CG denotes a cover glass, and I denotes the image pickup surface of an electronic image pickup element.

The first lens group G1 is composed of a negative meniscus lens L1 having a convex surface directed toward the object side, a prism L2, a biconvex positive lens L3, and a biconvex positive lens L4. The first lens group G1 has a positive refracting power as a whole.

The second lens group G2 is composed of a biconcave negative lens L5, and a cemented lens made up of a biconcave negative lens L6 and a positive meniscus lens L7 having a convex surface directed toward the object side. The second lens group G2 has a negative refracting power as a whole. In this configuration, the positive meniscus lens L7 having a convex surface directed toward the object side constitutes the positive lens LA, and the biconcave negative lens L6 constitutes the negative lens LB.

The third lens group G3 is composed of a biconvex positive lens L8, and a cemented lens made up of a biconvex positive lens L9 and a biconcave negative lens L10. The third lens group G3 has a positive refracting power as a whole.

The fourth lens group G4 is composed of a positive meniscus lens L11 having a convex surface directed toward the object side. The fourth lens group G4 has a positive refracting power as a whole.

The fifth lens group G5 is composed of a cemented lens made up of a biconcave negative lens L12 and a biconvex positive lens L13. The fifth lens group G5 has a negative refracting power as a whole.

During zooming from the wide angle end to the telephoto end, the first lens group G1 is fixed, the second lens group G2 moves toward the image side, the aperture stop S is fixed, the third lens group G3 moves toward the object side, the fourth lens group G4 moves toward the object side during zooming from the wide angle end to an intermediate focal length position and moves toward the image side during zooming from the intermediate focal length position to the telephoto end, and the fifth lens group G5 is fixed.

There are seven aspheric surfaces in total, which include the object side surface of the biconvex positive lens L3 in the first lens group G1, both surfaces of the biconcave negative lens L6 in the second lens group G2, the image side surface of the positive meniscus lens L7 having a convex surface directed toward the object side in the second lens group G2, both surfaces of the biconvex positive lens L8 in the third lens group G3, and the object side surface of the positive meniscus lens L11 having a convex surface directed toward the object side in the fourth lens group G4.

Figure 3A:
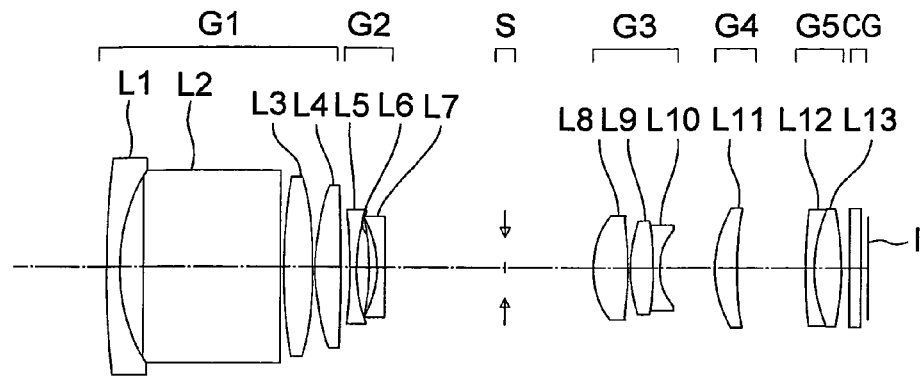
FIGS. 3A, 3B, and 3C are cross sectional views taken along the optical axis showing the optical configuration of a zoom lens according to embodiment 2 of the present invention in the state in which the zoom lens is focused on an object point at infinity, respectively at the wide angle end, at an intermediate focal length, and at the telephoto end.
Figure 3B:
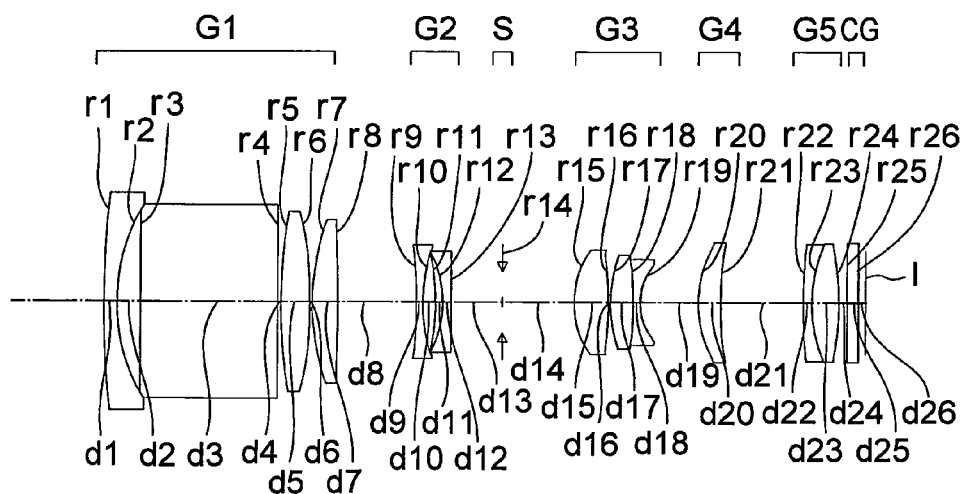
Figure 3C:
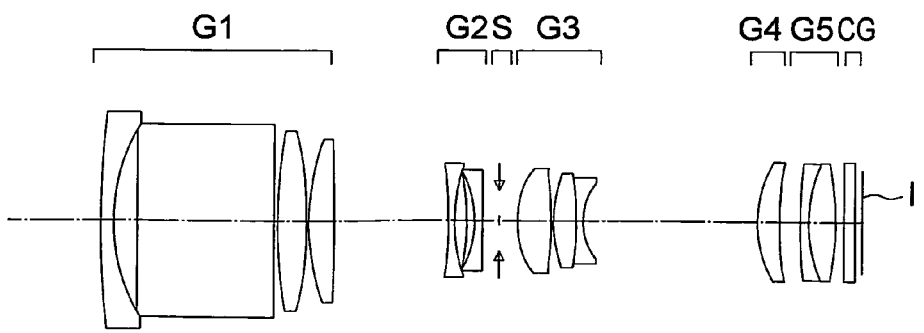

Next, a zoom lens according to embodiment 2 of the present invention will be described. FIGS. 3A, 3B, and 3C are cross sectional views taken along the optical axis showing the optical configuration of the zoom lens according to embodiment 2 of the present invention in the state in which the zoom lens is focused on an object point at infinity, where FIG. 3A is a cross sectional view of the zoom lens at the wide angle end, FIG. 3B is a cross sectional view of the zoom lens at an intermediate focal length position, and FIG. 3C is a cross sectional view of the zoom lens at the telephoto end.

Figure 4A:
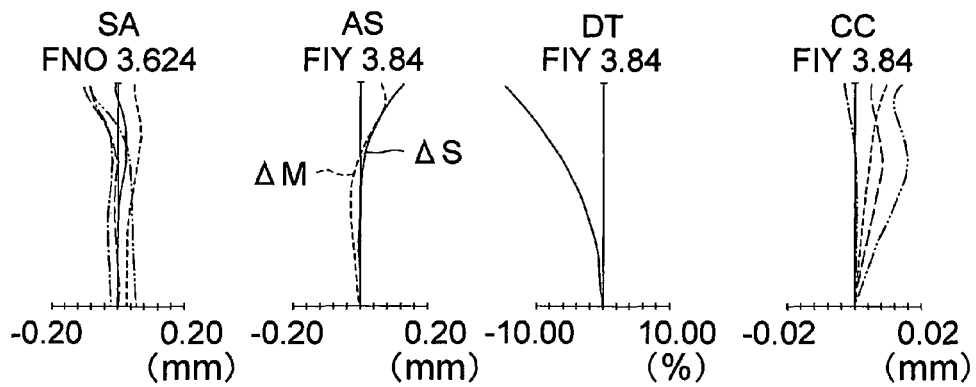
FIGS. 4A, 4B, and 4C are diagrams showing spherical aberration, astigmatism, distortion, and chromatic aberration of magnification of the zoom lens according to embodiment 2 in the state in which the zoom lens is focused on an object point at infinity, where
Figure 4B:
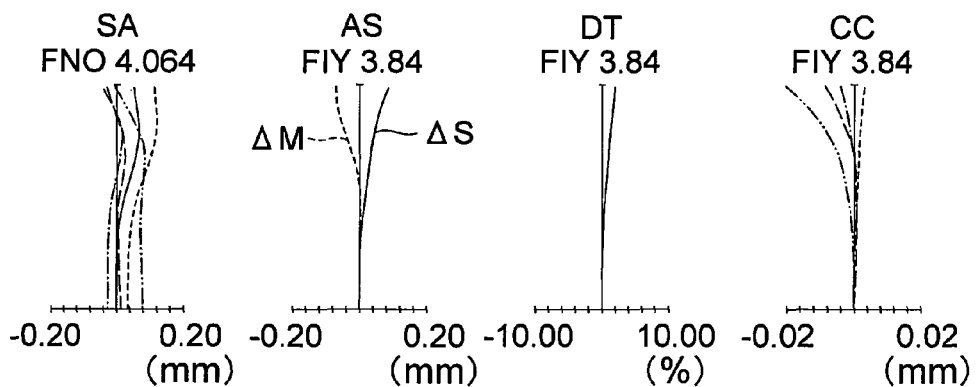
Figure 4C:
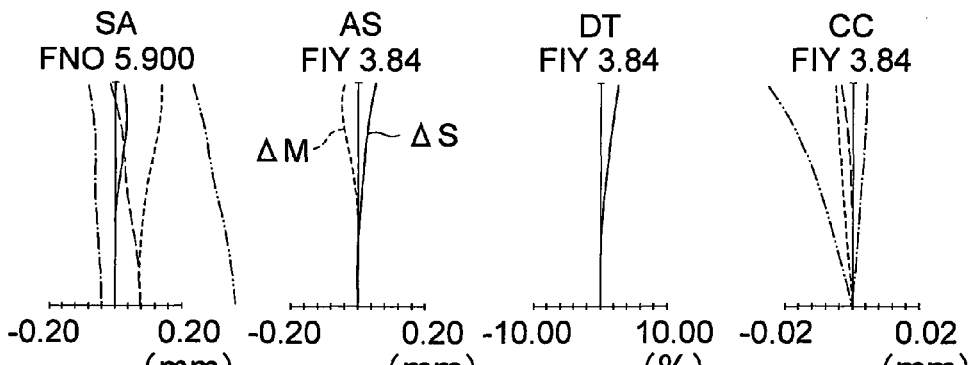

FIGS. 4A, 4B, and 4C are diagrams showing spherical aberration (SA), astigmatism (AS), distortion (DT), and chromatic aberration of magnification (CC) of the zoom lens according to embodiment 2 in the state in which the zoom lens is focused on an object point at infinity, where FIG. 4A is for the wide angle end, FIG. 4B is for the intermediate focal length position, and FIG. 4C is for the telephoto end.

As shown in FIGS. 3A, 3B, and 3C, the zoom lens according to embodiment 2 includes, in order from its object side, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a negative refracting power.

The first lens group G1 is composed of a negative meniscus lens L1 having a convex surface directed toward the object side, a prism L2, a biconvex positive lens L3, and a biconvex positive lens L4. The first lens group G1 has a positive refracting power as a whole.

The second lens group G2 is composed of a biconcave negative lens L5, and a cemented lens made up of a positive meniscus lens L6 having a convex surface directed toward the image side and a biconcave negative lens L7. The second lens group G2 has a negative refracting power as a whole. In this configuration, the positive meniscus lens L6 having a convex surface directed toward the image side constitutes the positive lens LA, and the biconcave negative lens L7 constitutes the negative lens LB.

The third lens group G3 is composed of a biconvex positive lens L8, and a cemented lens made up of a biconvex positive lens L9 and a biconcave negative lens L10. The third lens group G3 has a positive refracting power as a whole.

The fourth lens group G4 is composed of a positive meniscus lens L11 having a convex surface directed toward the object side. The fourth lens group G4 has a positive refracting power as a whole.

The fifth lens group G5 is composed of a cemented lens made up of a negative meniscus lens L12 having a convex surface directed toward the object side and a biconvex positive lens L13. The fifth lens group G5 has a negative refracting power as a whole.

During zooming from the wide angle end to the telephoto end, the first lens group G1 is fixed, the second lens group G2 moves toward the image side, the aperture stop S is fixed, the third lens group G3 moves toward the object side, the fourth lens group G4 moves toward the object side during zooming from the wide angle end to an intermediate focal length position and moves toward the image side during zooming from the intermediate focal length position to the telephoto end, and the fifth lens group G5 is fixed.

There are seven aspheric surfaces in total, which include the object side surface of the biconvex positive lens L3 in the first lens group G1, both surfaces of the positive meniscus lens L6 having a convex surface directed toward the image side in the second lens group G2, the image side surface of the biconcave negative lens L7 in the second lens group G2, both surfaces of the biconvex positive lens L8 in the third lens group G3, and the object side surface of the positive meniscus lens L11 having a convex surface directed toward the object side in the fourth lens group G4.

Figure 5A:
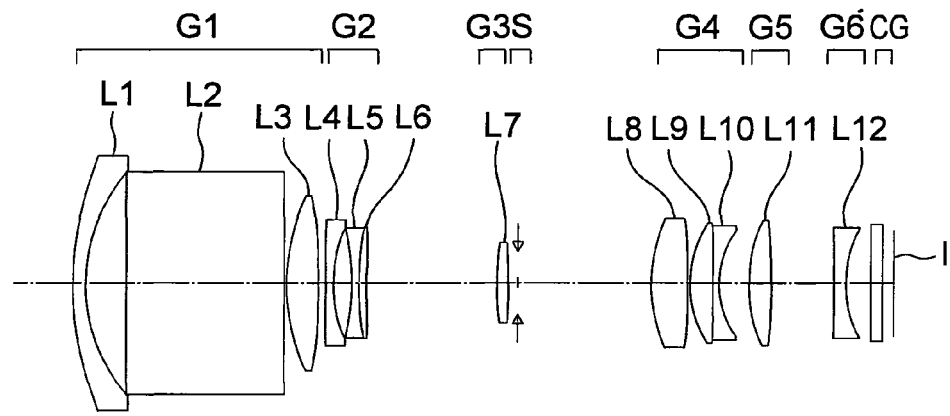
FIGS. 5A, 5B, and 5C are cross sectional views taken along the optical axis showing the optical configuration of a zoom lens according to embodiment 3 of the present invention in the state in which the zoom lens is focused on an object point at infinity, respectively at the wide angle end, at an intermediate focal length, and at the telephoto end.
Figure 5B:
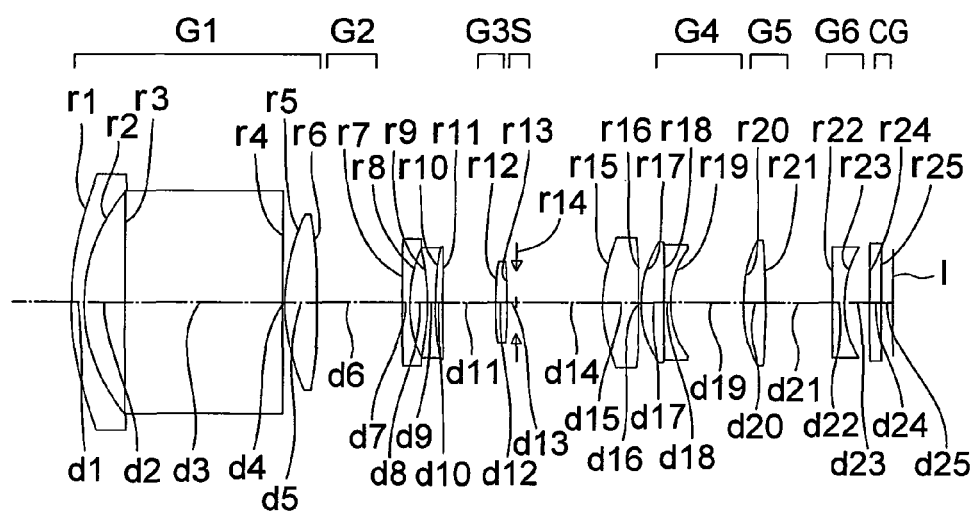
Figure 5C:
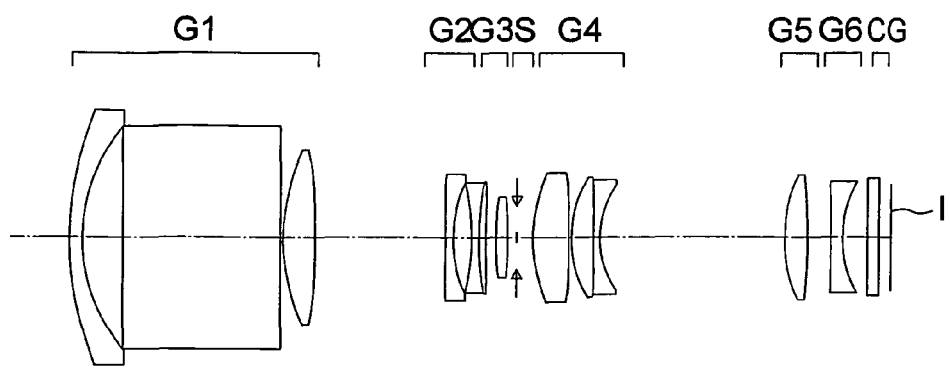

Next, a zoom lens according to embodiment 3 of the present invention will be described. FIGS. 5A, 5B, and 5C are cross sectional views taken along the optical axis showing the optical configuration of the zoom lens according to embodiment 3 of the present invention in the state in which the zoom lens is focused on an object point at infinity, where FIG. 5A is a cross sectional view of the zoom lens at the wide angle end, FIG. 5B is a cross sectional view of the zoom lens at an intermediate focal length position, and FIG. 5C is a cross sectional view of the zoom lens at the telephoto end.

Figure 6A:
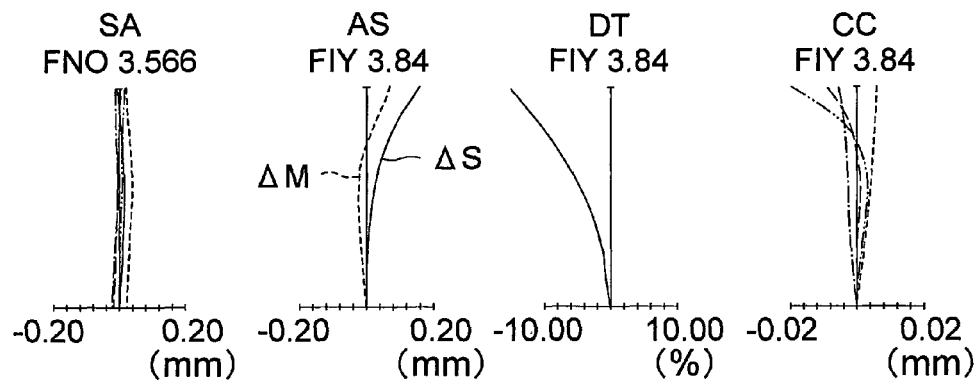
FIGS. 6A, 6B, and 6C are diagrams showing spherical aberration, astigmatism, distortion, and chromatic aberration of magnification of the zoom lens according to embodiment 3 in the state in which the zoom lens is focused on an object point at infinity, where
Figure 6B:
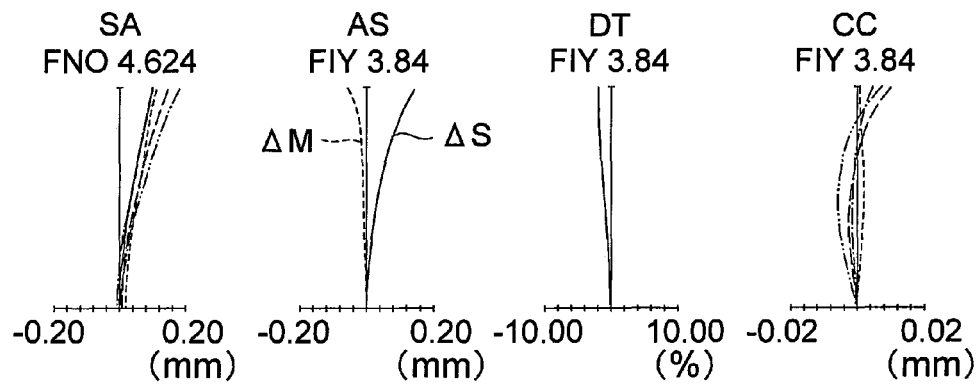
Figure 6C:
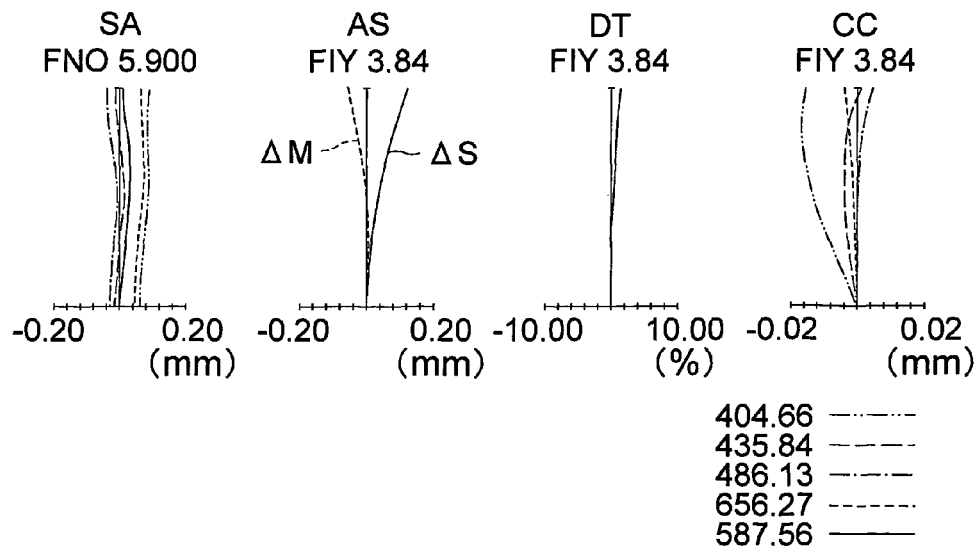

FIGS. 6A, 6B, and 6C are diagrams showing spherical aberration (SA), astigmatism (AS), distortion (DT), and chromatic aberration of magnification (CC) of the zoom lens according to embodiment 3 in the state in which the zoom lens is focused on an object point at infinity, where FIG. 6A is for the wide angle end, FIG. 6B is for the intermediate focal length position, and FIG. 6C is for the telephoto end.

As shown in FIGS. 5A, 5B, and 5C, the zoom lens according to embodiment 3 includes, in order from its object side, a first lens group G1 having a positive refracting power, a second lens group G2 having a negative refracting power, a third lens group G3 having a positive refracting power, an aperture stop S, a fourth lens group G4 having a positive refracting power, a fifth lens group G5 having a positive refracting power, and a sixth lens group G6 having a negative refracting power.

The first lens group G1 is composed of a negative meniscus lens L1 having a convex surface directed toward the object side, a prism L2, and a biconvex positive lens L3. The first lens group G1 has a positive refracting power as a whole.

The second lens group G2 is composed of a biconcave negative lens L4, and a cemented lens made up of a biconcave negative lens L5 and a positive meniscus lens L6 having a convex surface directed toward the object side. The second lens group G2 has a negative refracting power as a whole. In this configuration, the positive meniscus lens L6 having a convex surface directed toward the object side constitutes the positive lens LA, and the biconcave negative lens L5 constitutes the negative lens LB.

The third lens group G3 is composed of a biconvex positive lens L7. The third lens group G3 has a positive refracting power as a whole.

The fourth lens group G4 is composed of a biconvex positive lens L8, and a cemented lens made up of a biconvex positive lens L9 and a biconcave negative lens L10. The fourth lens group G4 has a positive refracting power as a whole.

The fifth lens group G5 is composed of a biconvex positive lens L11. The fifth lens group G5 has a positive refracting power as a whole.

The sixth lens group G6 is composed of a biconcave negative lens L12. The fifth lens group G5 has a negative refracting power as a whole.

During zooming from the wide angle end to the telephoto end, the first lens group G1 is fixed, the second lens group G2 moves toward the image side, the third lens group G3 is fixed, the aperture stop S is fixed, the fourth lens group G4 moves toward the object side, the fifth lens group G5 moves toward the object side during zooming from the wide angle end to an intermediate focal length position and moves toward the image side during zooming from the intermediate focal length position to the telephoto end, and the sixth lens group G5 is fixed.

There are eight aspheric surfaces in total, which include both surfaces of the biconvex positive lens L3 in the first lens group G1, both surfaces of the biconcave negative lens L5 in the second lens group G2, the image side surface of the positive meniscus lens L6 having a convex surface directed toward the object side in the second lens group G2, both surfaces of the biconvex positive lens L8 in the fourth lens group G4, and the object side surface of the biconvex positive lens L11 in the fifth lens group G5.

Figure 7A:
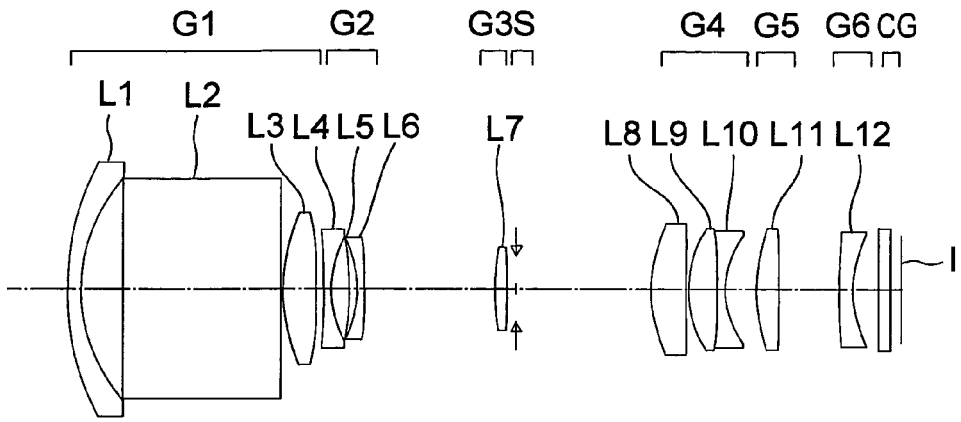
FIGS. 7A, 7B, and 7C are cross sectional views taken along the optical axis showing the optical configuration of a zoom lens according to embodiment 4 of the present invention in the state in which the zoom lens is focused on an object point at infinity, respectively at the wide angle end, at an intermediate focal length, and at the telephoto end.
Figure 7B:
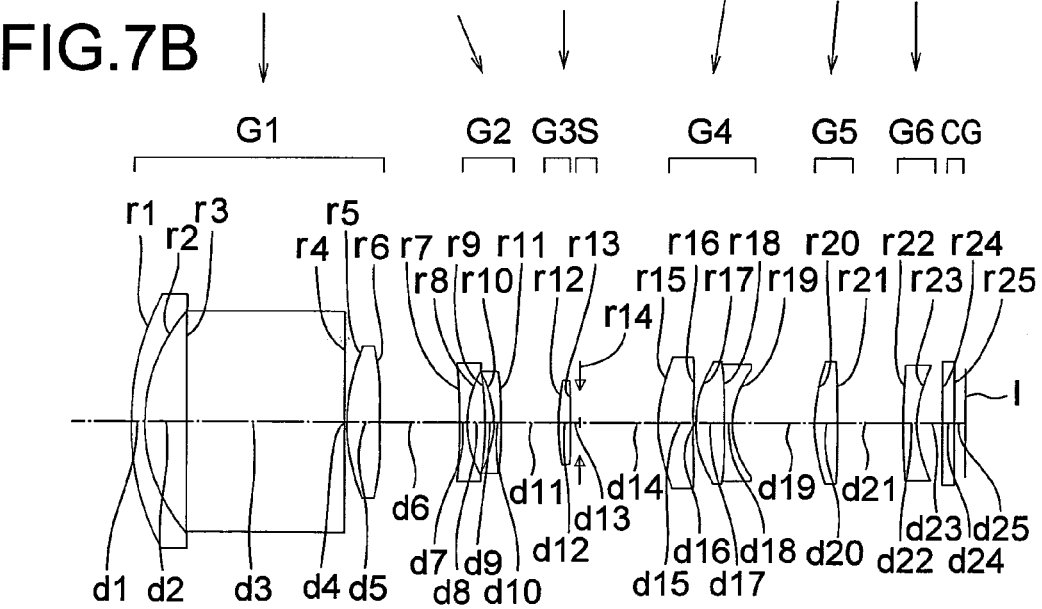
Figure 7C:
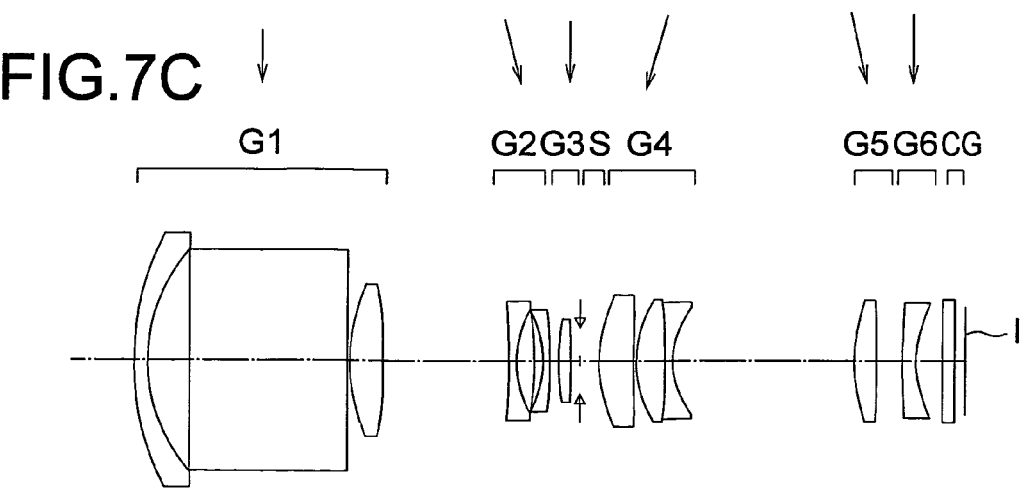

Next, a zoom lens according to embodiment 4 of the present invention will be described. FIGS. 7A, 7B, and 7C are cross sectional views taken along the optical axis showing the optical configuration of the zoom lens according to embodiment 4 of the present invention in the state in which the zoom lens is focused on an object point at infinity, where FIG. 7A is a cross sectional view of the zoom lens at the wide angle end, FIG. 7B is a cross sectional view of the zoom lens at an intermediate focal length position, and FIG. 7C is a cross sectional view of the zoom lens at the telephoto end.

Figure 8A:
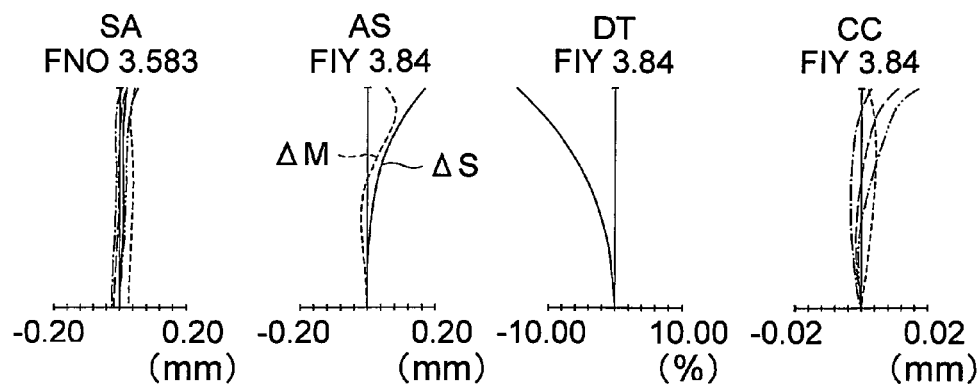
FIGS. 8A, 8B, and 8C are diagrams showing spherical aberration, astigmatism, distortion, and chromatic aberration of magnification of the zoom lens according to embodiment 4 in the state in which the zoom lens is focused on an object point at infinity, where
Figure 8B:
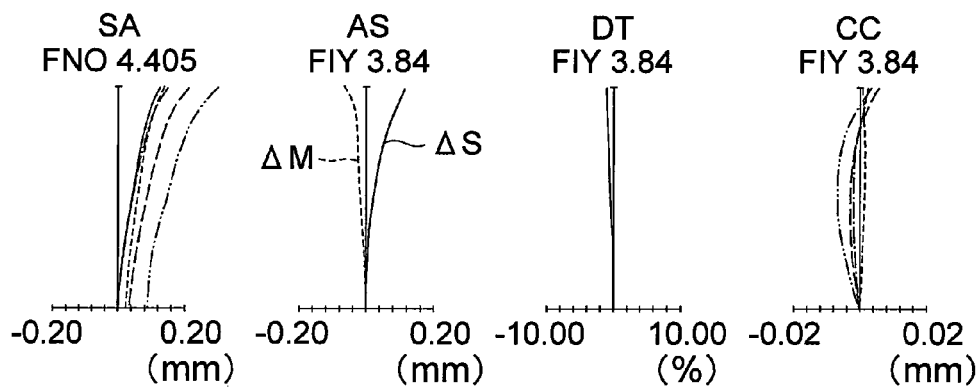
Figure 8C:
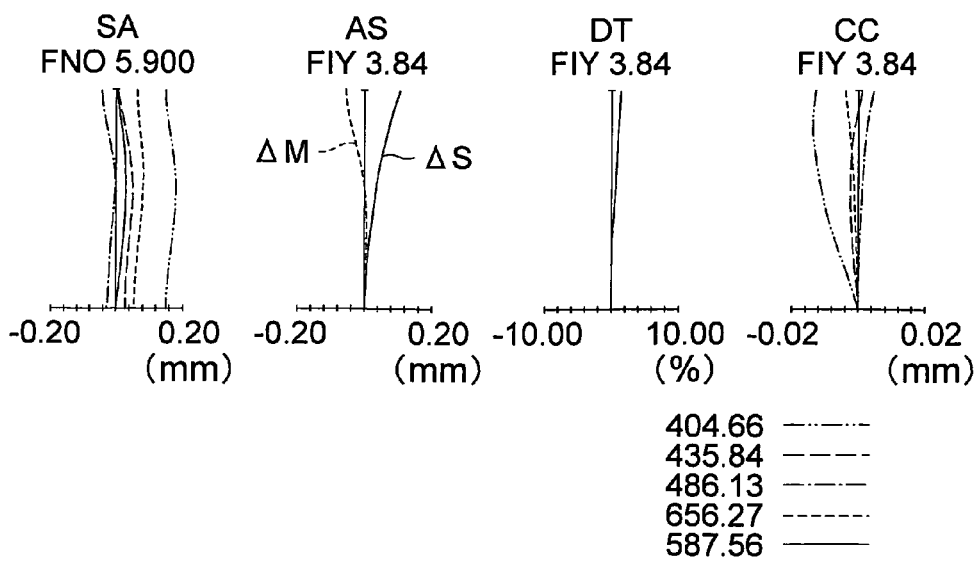

FIGS. 8A, 8B, and 8C are diagrams showing spherical aberration (SA), astigmatism (AS), distortion (DT), and chromatic aberration of magnification (CC) of the zoom lens according to embodiment 4 in the state in which the zoom lens is focused on an object point at infinity, where FIG. 8A is for the wide angle end, FIG. 8B is for the intermediate focal length position, and FIG. 8C is for the telephoto end.

As shown in FIGS. 7A, 7B, and 7C, the zoom lens according to embodiment 4 includes, in order from its object side, a first lens group G1 having a positive refracting power, a second lens group G2 having a negative refracting power, a third lens group G3 having a positive refracting power, an aperture stop S, a fourth lens group G4 having a positive refracting power, a fifth lens group G5 having a positive refracting power, and a sixth lens group G6 having a negative refracting power.

The first lens group G1 is composed of a negative meniscus lens L1 having a convex surface directed toward the object side, a prism L2, and a biconvex positive lens L3. The first lens group G1 has a positive refracting power as a whole.

The second lens group G2 is composed of a biconcave negative lens L4, and a cemented lens made up of a positive meniscus lens L5 having a convex surface directed toward the image side and a negative meniscus lens L6 having a convex surface directed toward the image side. The second lens group G2 has a negative refracting power as a whole. In this configuration, the positive meniscus lens L5 having a convex surface directed toward the image side constitutes the positive lens LA, and the negative meniscus lens L6 having a convex surface directed toward the image side constitutes the negative lens LB.

The third lens group G3 is composed of a biconvex positive lens L7. The third lens group G3 has a positive refracting power as a whole.

The fourth lens group G4 is composed of a biconvex positive lens L8, and a cemented lens made up of a biconvex positive lens L9 and a biconcave negative lens L10. The fourth lens group G4 has a positive refracting power as a whole.

The fifth lens group G5 is composed of a biconvex positive lens L11. The fifth lens group G5 has a negative positive power as a whole.

The sixth lens group G6 is composed of a biconcave negative lens L12. The sixth lens group G6 has a negative positive power as a whole.

During zooming from the wide angle end to the telephoto end, the first lens group G1 is fixed, the second lens group G2 moves toward the image side, the third lens group G3 is fixed, the aperture stop S is fixed, the fourth lens group G4 moves toward the object side, the fifth lens group G5 moves toward the object side during zooming from the wide angle end to an intermediate focal length position and moves toward the image side during zooming from the intermediate focal length position to the telephoto end, and the sixth lens group G6 is fixed.

There are nine aspheric surfaces in total, which include both surfaces of the biconvex positive lens L3 in the first lens group G1, both surfaces of the positive meniscus lens L5 having a convex surface directed toward the image side in the second lens group G2, the image side surface of the negative meniscus lens L6 having a convex surface directed toward the image side in the second lens group G2, both surfaces of the biconvex positive lens L8 in the fourth lens group G4, the object side surface of the biconvex positive lens L11 in the fifth lens group G5, and the object side surface of the biconcave negative lens L12 in the sixth lens group G6.

Figure 9A:
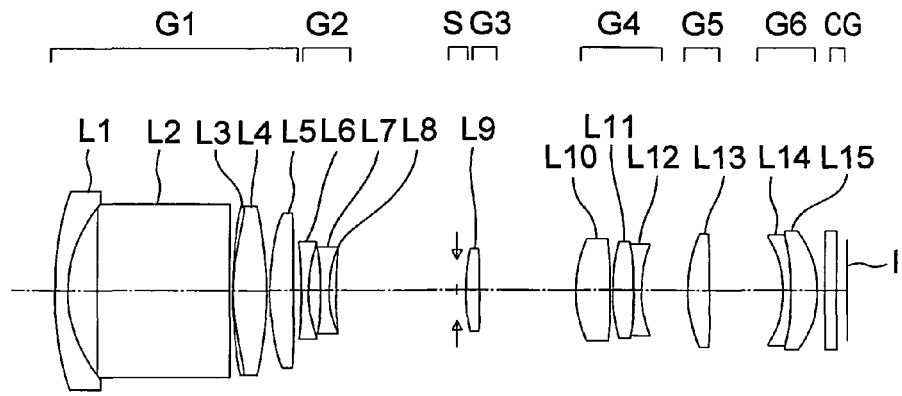
FIGS. 9A, 9B, and 9C are cross sectional views taken along the optical axis showing the optical configuration of a zoom lens according to embodiment 5 of the present invention in the state in which the zoom lens is focused on an object point at infinity, respectively at the wide angle end, at an intermediate focal length, and at the telephoto end.
Figure 9B:
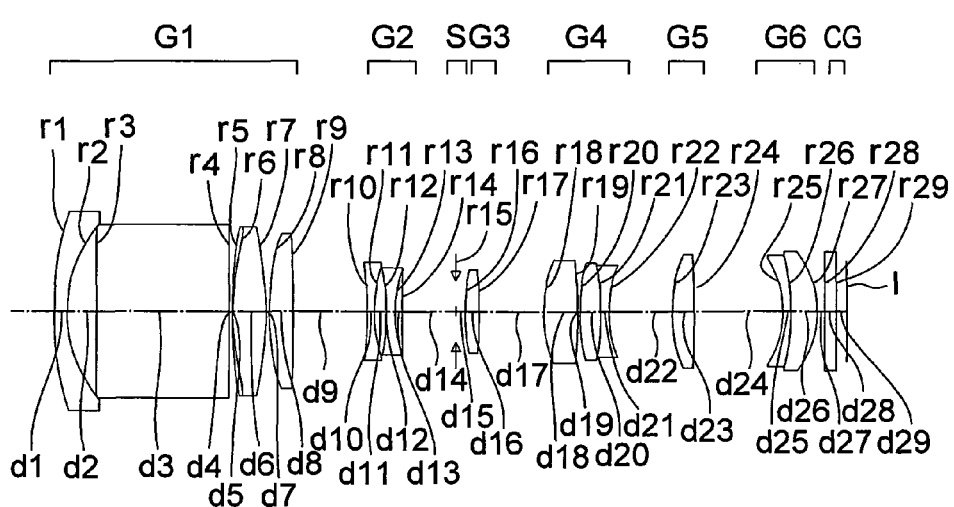
Figure 9C:
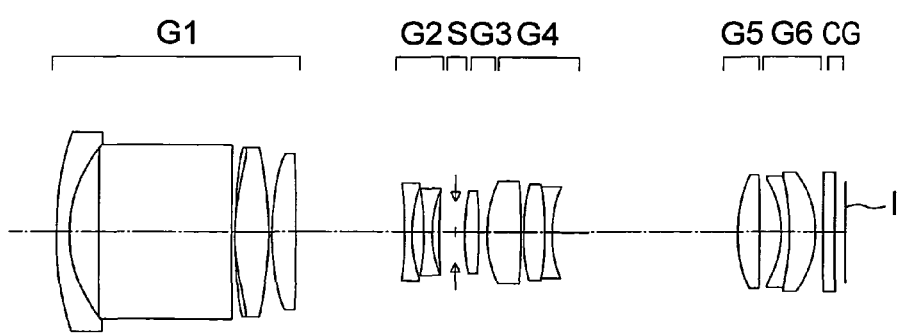

Next, a zoom lens according to embodiment 5 of the present invention will be described. FIGS. 9A, 9B, and 9C are cross sectional views taken along the optical axis showing the optical configuration of the zoom lens according to embodiment 5 of the present invention in the state in which the zoom lens is focused on an object point at infinity, where FIG. 9A is a cross sectional view of the zoom lens at the wide angle end, FIG. 9B is a cross sectional view of the zoom lens at an intermediate focal length position, and FIG. 9C is a cross sectional view of the zoom lens at the telephoto end.

Figure 10A:
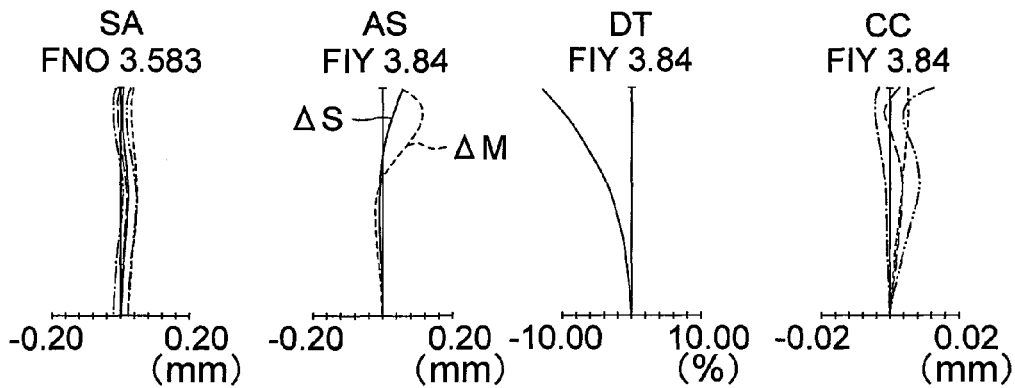
FIGS. 10A, 10B, and 10C are diagrams showing spherical aberration, astigmatism, distortion, and chromatic aberration of magnification of the zoom lens according to embodiment 5 in the state in which the zoom lens is focused on an object point at infinity, where
Figure 10B:
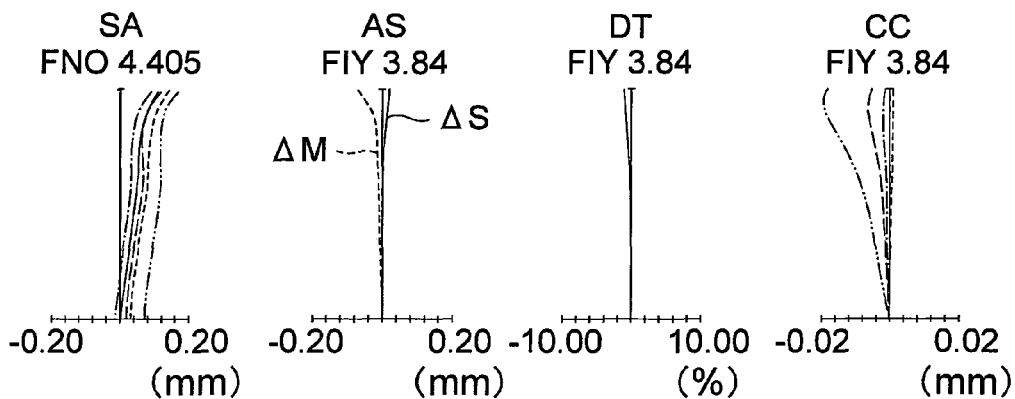
Figure 10C:
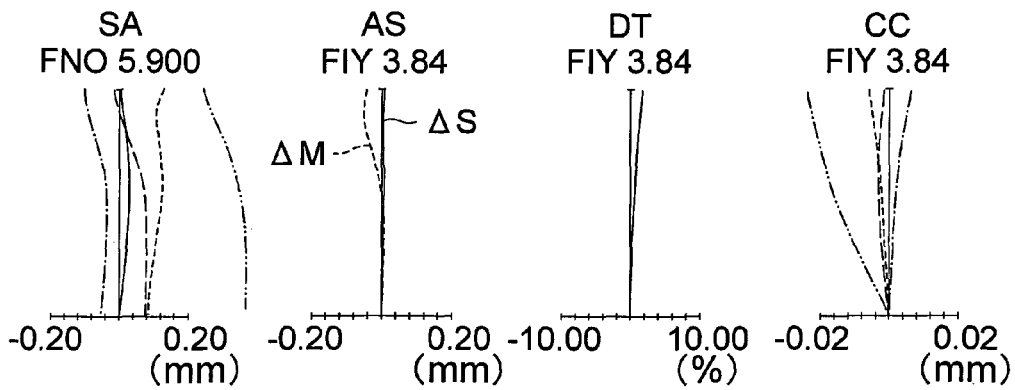

FIGS. 10A, 10B, and 10C are diagrams showing spherical aberration (SA), astigmatism (AS), distortion (DT), and chromatic aberration of magnification (CC) of the zoom lens according to embodiment 5 in the state in which the zoom lens is focused on an object point at infinity, where FIG. 10A is for the wide angle end, FIG. 10B is for the intermediate focal length position, and FIG. 10C is for the telephoto end.

As shown in FIGS. 9A, 9B, and 9C, the zoom lens according to embodiment 5 includes, in order from its object side, a first lens group G1 having a positive refracting power, a second lens group G2 having a negative refracting power, an aperture stop S, a third lens group G3 having a positive refracting power, a fourth lens group G4 having a positive refracting power, a fifth lens group G5 having a positive refracting power, and a sixth lens group G6 having a negative refracting power.

The first lens group G1 is composed of a negative meniscus lens L1 having a convex surface directed toward the object side, a prism L2, a cemented lens made up of a negative meniscus lens L3 having a convex surface directed toward the object side and a biconvex positive lens L4, and a biconvex positive lens L5. The first lens group G1 has a positive refracting power as a whole.

The second lens group G2 is composed of a biconcave negative lens L6, and a cemented lens made up of a biconcave negative lens L7 and a positive meniscus lens L8 having a convex surface directed toward the object side. The second lens group G2 has a negative refracting power as a whole. In this configuration, the positive meniscus lens L8 having a convex surface directed toward the object side constitutes the positive lens LA, and the biconcave negative lens L7 constitutes the negative lens LB.

The third lens group G3 is composed of a biconvex positive lens L9. The third lens group G3 has a positive refracting power as a whole.

The fourth lens group G4 is composed of a biconvex positive lens L10, and a cemented lens made up of a biconvex positive lens L11 and a biconcave negative lens L12. The fourth lens group G4 has a positive refracting power as a whole.

The fifth lens group G5 is composed of a biconvex positive lens L13. The fifth lens group G5 has a positive refracting power as a whole.

The sixth lens group G6 is composed of a cemented lens made up of a negative meniscus lens L14 having a convex surface directed toward the image side and a positive meniscus lens L15 having a convex surface directed toward the image side. The sixth lens group G6 has a negative refracting power as a whole.

During zooming from the wide angle end to the telephoto end, the first lens group G1 is fixed, the second lens group G2 moves toward the image side, the third lens group G3 is fixed, the aperture stop S is fixed, the fourth lens group G4 moves toward the object side, the fifth lens group G5 moves toward the object side during zooming from the wide angle end to an intermediate focal length position and moves toward the image side during zooming from the intermediate focal length position to the telephoto end, and the sixth lens group G6 is fixed.

There are nine aspheric surfaces in total, which include both surfaces of the negative meniscus lens L3 having a convex surface directed toward the object side in the first lens group G1, the image side surface of the biconvex positive lens L4 in the first lens group G1, both surfaces of the biconcave negative lens L7 in the second lens group G2, the image side surface of the positive meniscus lens L8 having a convex surface directed toward the object side in the second lens group G2, both surfaces of the biconvex positive lens L10 in the fourth lens group G4, and the object side surface of the biconvex positive lens L13 in the fifth lens group G5.

Figure 11A:
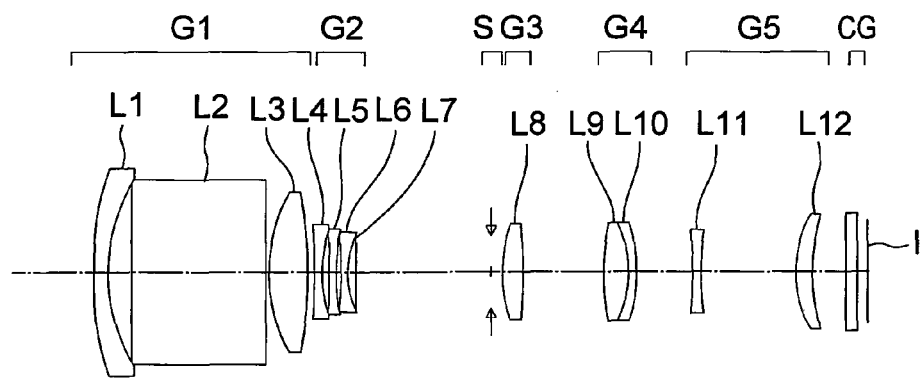
FIGS. 11A, 11B, and 11C are cross sectional views taken along the optical axis showing the optical configuration of a zoom lens according to embodiment 6 of the present invention in the state in which the zoom lens is focused on an object point at infinity, respectively at the wide angle end, at an intermediate focal length, and at the telephoto end.
Figure 11B:
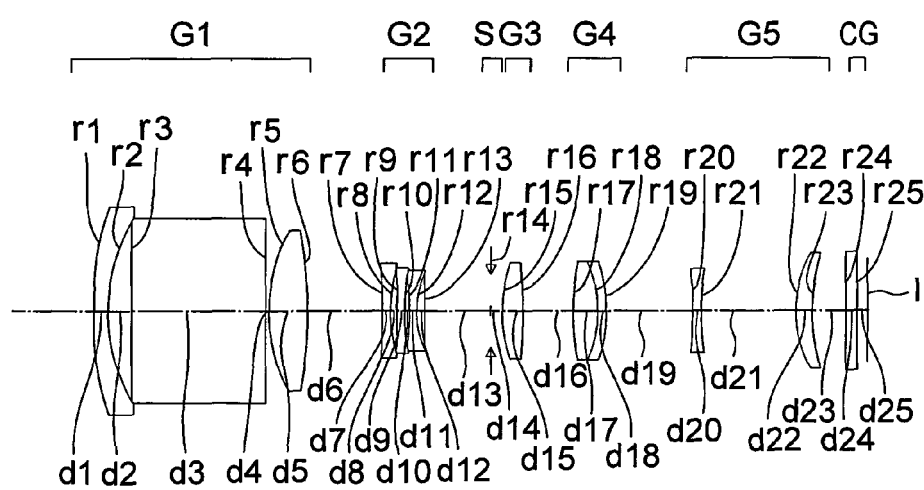
Figure 11C:
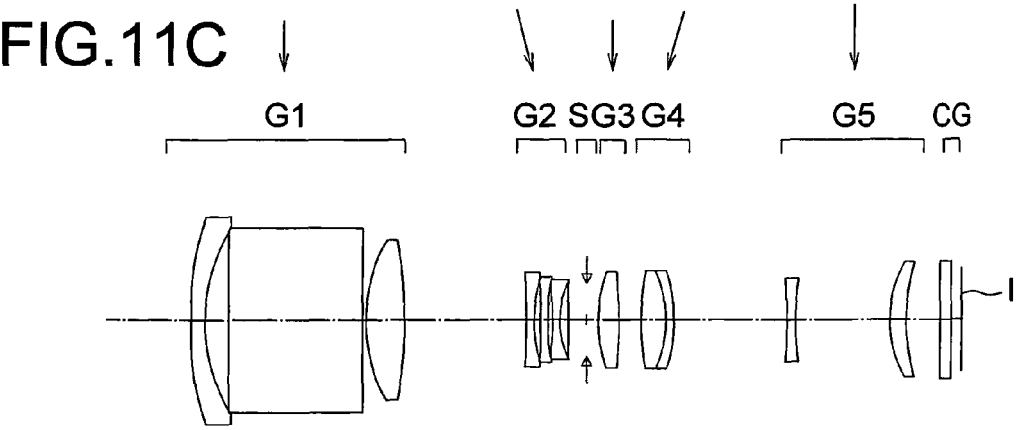

Next, a zoom lens according to embodiment 6 of the present invention will be described. FIGS. 11A, 11B, and 11C are cross sectional views taken along the optical axis showing the optical configuration of the zoom lens according to embodiment 6 of the present invention in the state in which the zoom lens is focused on an object point at infinity, where FIG. 11A is a cross sectional view of the zoom lens at the wide angle end, FIG. 11B is a cross sectional view of the zoom lens at an intermediate focal length position, and FIG. 11C is a cross sectional view of the zoom lens at the telephoto end.

Figure 12A:
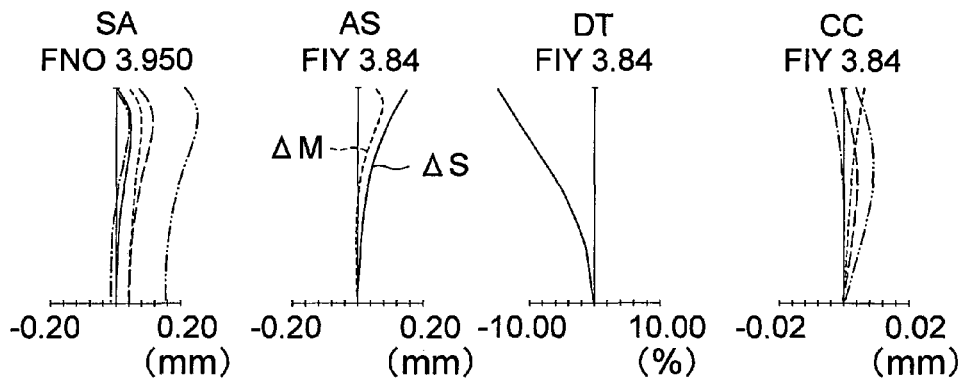
FIGS. 12A, 12B, and 12C are diagrams showing spherical aberration, astigmatism, distortion, and chromatic aberration of magnification of the zoom lens according to embodiment 6 in the state in which the zoom lens is focused on an object point at infinity, where
Figure 12B:
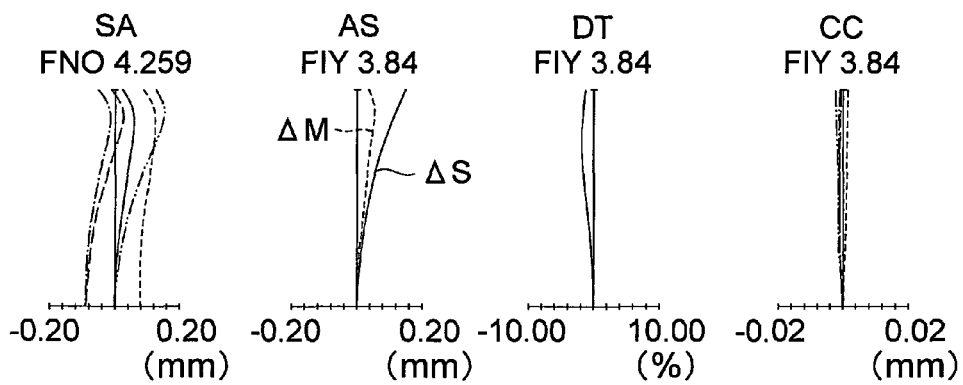
Figure 12C:
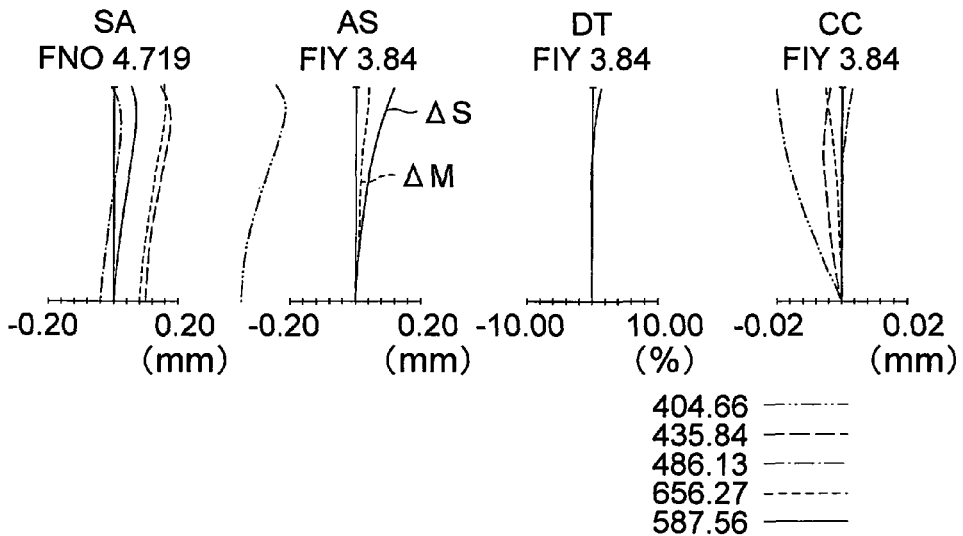

FIGS. 12A, 12B, and 12C are diagrams showing spherical aberration (SA), astigmatism (AS), distortion (DT), and chromatic aberration of magnification (CC) of the zoom lens according to embodiment 6 in the state in which the zoom lens is focused on an object point at infinity, where FIG. 12A is for the wide angle end, FIG. 12B is for the intermediate focal length position, and FIG. 12C is for the telephoto end.

As shown in FIGS. 11A, 11B, and 11C, the zoom lens according to embodiment 6 includes, in order from its object side, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a negative refracting power.

The first lens group G1 is composed of a negative meniscus lens L1 having a convex surface directed toward the object side, a prism L2, and a biconvex positive lens L3. The first lens group G1 has a positive refracting power as a whole.

The second lens group G2 is composed of a biconvex negative lens L4, a biconcave negative lens L5, and a cemented lens made up of a biconcave negative lens L6 and a positive meniscus lens L7 having a convex surface directed toward the object side. The second lens group G2 has a negative refracting power as a whole. In this configuration, the positive meniscus lens L7 having a convex surface directed toward the object side constitutes the positive lens LA, and the biconcave negative lens L6 constitutes the negative lens LB.

The third lens group G3 is composed of a biconvex positive lens L8. The third lens group G3 has a positive refracting power as a whole.

The fourth lens group G4 is composed of a cemented lens made up of a biconvex positive lens L9 and a negative meniscus lens L10 having a convex surface directed toward the image side. The fourth lens group G4 has a positive refracting power as a whole.

The fifth lens group G5 is composed of a biconcave negative lens L11 and a positive meniscus lens L12 having a convex surface directed toward the object side. The fifth lens group G5 has a negative refracting power as a whole.

During zooming from the wide angle end to the telephoto end, the first lens group G1 is fixed, the second lens group G2 moves toward the image side, the aperture stop S is fixed, the third lens group G3 is fixed, the fourth lens group G4 moves toward the object side, and the fifth lens group G5 is fixed.

There are seven aspheric surfaces in total, which include the object side surface of the biconvex positive lens L3 in the first lens group G1, both surfaces of the biconcave negative lens L6 in the second lens group G2, the image side surface of the positive meniscus lens L7 having a convex surface directed toward the object side in the second lens group G2, the object side surface of the biconvex positive lens L8 in the third lens group G3, the object side surface of the biconvex positive lens L9 in the fourth lens group G4, and the object side surface of the positive meniscus lens L12 having a convex surface directed toward the object side in the fifth lens group G5.

Figure 13A:
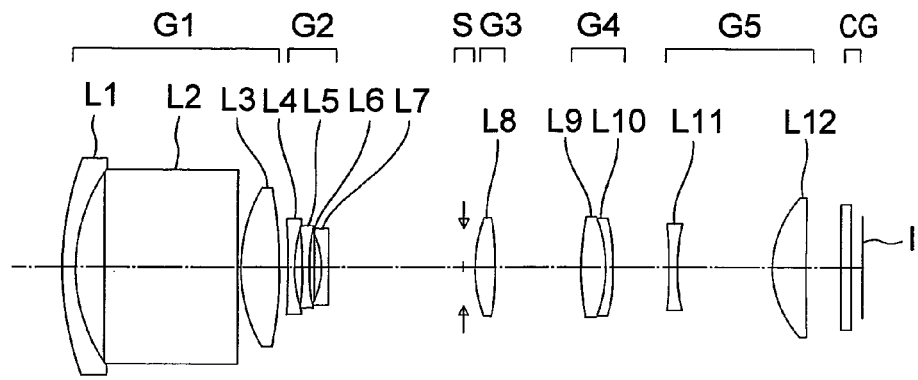
FIGS. 13A, 13B, and 13C are cross sectional views taken along the optical axis showing the optical configuration of a zoom lens according to embodiment 7 of the present invention in the state in which the zoom lens is focused on an object point at infinity, respectively at the wide angle end, at an intermediate focal length, and at the telephoto end.
Figure 13B:
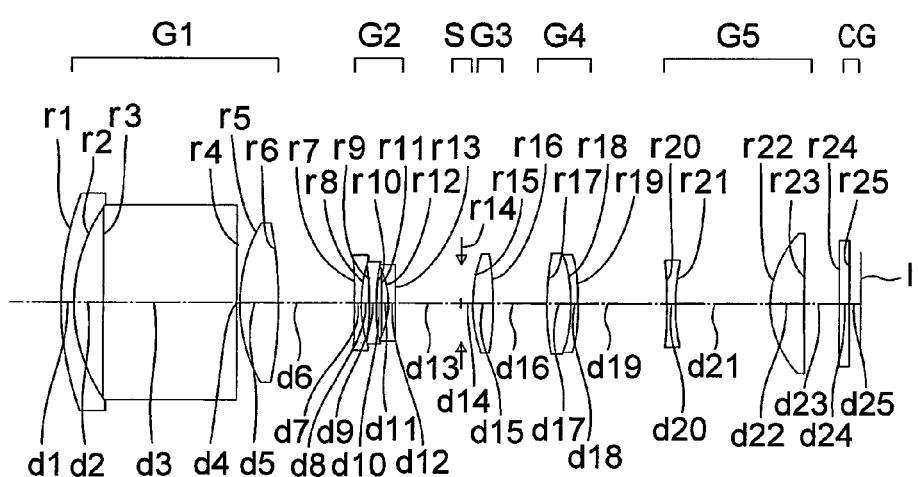
Figure 13C:
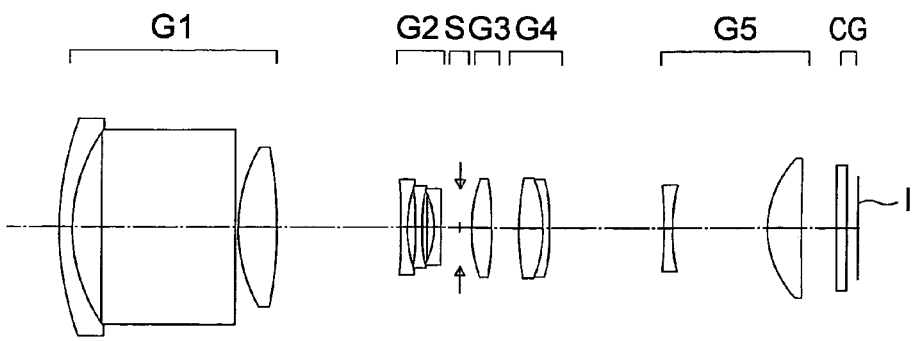

Next, a zoom lens according to embodiment 7 of the present invention will be described. FIGS. 13A, 13B, and 13C are cross sectional views taken along the optical axis showing the optical configuration of the zoom lens according to embodiment 7 of the present invention in the state in which the zoom lens is focused on an object point at infinity, where FIG. 13A is a cross sectional view of the zoom lens at the wide angle end, FIG. 13B is a cross sectional view of the zoom lens at an intermediate focal length position, and FIG. 13C is a cross sectional view of the zoom lens at the telephoto end.

FIGS. 14A, 14B, and 14C are diagrams showing spherical aberration (SA), astigmatism (AS), distortion (DT), and chromatic aberration of magnification (CC) of the zoom lens according to embodiment 7 in the state in which the zoom lens is focused on an object point at infinity, where FIG. 14A is for the wide angle end, FIG. 14B is for the intermediate focal length position, and FIG. 14C is for the telephoto end.

As shown in FIGS. 13A, 13B, and 13C, the zoom lens according to embodiment 7 includes, in order from its object side, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power.

The first lens group G1 is composed of a negative meniscus lens L1 having a convex surface directed toward the object side, a prism L2, a biconvex positive lens L3, and a biconvex positive lens L4. The first lens group G1 has a positive refracting power as a whole.

The second lens group G2 is composed of a biconcave negative lens L4, a biconcave negative lens L5, and a cemented lens made up of a positive meniscus lens L6 having a convex surface directed toward the image side and a biconcave negative lens L7. The second lens group G2 has a negative refracting power as a whole. In this configuration, the positive meniscus lens L6 having a convex surface directed toward the image side constitutes the positive lens LA, and the biconcave negative lens L7 constitutes the negative lens LB.

The third lens group G3 is composed of a biconvex positive lens L8. The third lens group G3 has a positive refracting power as a whole.

The fourth lens group G4 is composed of a cemented lens made up of a biconvex positive lens L9 and a negative meniscus lens L10 having a convex surface directed toward the image side. The fourth lens group G4 has a positive refracting power as a whole.

The fifth lens group G5 is composed of a biconcave negative lens L11 and a biconvex positive lens L12. The fifth lens group G5 has a positive refracting power as a whole.

During zooming from the wide angle end to the telephoto end, the first lens group G1 is fixed, the second lens group G2 moves toward the image side, the aperture stop S is fixed, the third lens group G3 is fixed, the fourth lens group G4 moves toward the object side, and the fifth lens group G5 is fixed.

There are seven aspheric surfaces in total, which include the object side surface of the biconvex positive lens L3 in the first lens group G1, both surfaces of the positive meniscus lens L6 having a convex surface directed toward the image side in the second lens group G2, the image side surface of the biconcave negative lens L7 in the second lens group G2, the object side surface of the biconvex positive lens L8 in the third lens group G3, the object side surface of the biconvex positive lens L9 in the fourth lens group G4, and the object side surface of the biconvex positive lens L12 in the fifth lens group G5.

Numerical data of each embodiment described above is shown below. each of r1, r2, denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe constant for each lens. Apart from symbols described above, $F_{NO}$ denotes an F number, f denotes a focal length of the entire zoom lens system, D0 denotes a distance between an object and the first surface Further, * denotes an aspheric data.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane. FIY denotes an image height, WE denotes a wide angle end, ST denotes an intermediate state, TE denotes a telephoto end When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A4y^4+A6y^6+A8y^8+A10y^{10}$$

where, r denotes a paraxial radius of curvature, K denotes a conical coefficient, A4, A6, A8, A10, and A12 denote aspherical surface coefficients of a fourth order, a sixth order, an eight order, a tenth order, and a twelfth order respectively. Moreover, in the aspherical surface coefficients, 'E-n' (where, n is an integral number) indicates '$10^{-n}$'.

Further these symbols are common in below numerical data.

Example 1

| | | Unit mm | | |
|---|---|---|---|---|
| | | Surface data | | |
| Surface no. | r | d | nd | vd |
| Object plane | ∞ | ∞ | | |
| 1 | 61.4059 | 1.0000 | 2.14352 | 17.77 |
| 2 | 13.2975 | 1.7000 | | |
| 3 | ∞ | 9.8000 | 2.14352 | 17.77 |
| 4 | ∞ | 0.2000 | | |
| 5* | 36.4381 | 2.2000 | 1.74320 | 49.34 |
| 6 | −25.7663 | 0.1500 | | |
| 7 | 17.8315 | 1.8000 | 1.80610 | 40.92 |
| 8 | −233.9279 | Variable | | |
| 9 | −32.1125 | 0.5000 | 1.81600 | 46.62 |
| 10 | 11.7079 | 0.9000 | | |
| 11* | −15.1920 | 0.6000 | 1.69350 | 53.21 |
| 12* | 10.7991 | 0.5000 | 1.73000 | 16.50 |
| 13* | 181.3108 | Variable | | |
| 14(Stop) | ∞ | Variable | | |
| 15* | 6.4405 | 2.5000 | 1.83481 | 42.71 |
| 16* | −24.8680 | 0.1500 | | |
| 17 | 9.8973 | 1.6000 | 1.69680 | 55.53 |
| 18 | −26.3168 | 0.5000 | 2.00069 | 25.46 |
| 19 | 4.5616 | Variable | | |
| 20* | 10.3753 | 1.6000 | 1.52540 | 56.25 |
| 21 | 46.5909 | Variable | | |
| 22 | −168.9561 | 0.6000 | 2.14352 | 17.77 |
| 23 | 13.4785 | 2.0000 | 1.51633 | 64.14 |
| 24 | −16.0741 | 0.6000 | | |
| 25 | ∞ | 0.8000 | 1.51633 | 64.14 |
| 26 | ∞ | 0.5005 | | |
| Image plane(Light receiving surface) ∞ | | | | |

Aspherical surface data

5th surface

K = −0.3249,
A2 = 0.0000E+00, A4 = 1.0839E−05, A6 = 7.8637E−08, A8 = −6.4086E−10,
A10 = 0.0000E+00

11th surface

K = −0.2922,
A2 = 0.0000E+00, A4 = 3.1163E−04, A6 = −9.5170E−05, A8 = 4.6713E−06,
A10 = 0.0000E+00

12th surface

K = −1.0223,
A2 = 0.0000E+00, A4 = −3.5011E−04, A6 = 2.0097E−05, A8 = 0.0000E+00,
A10 = 0.0000E+00

13th surface

K = −4.8409,
A2 = 0.0000E+00, A4 = 2.1889E−04, A6 = −8.0961E−05, A8 = 4.5756E−06,
A10 = 0.0000E+00

15th surface

K = −0.5930,
A2 = 0.0000E+00, A4 = 1.5571E−04, A6 = −1.0264E−05, A8 = 2.3514E−06,
A10 = 0.0000E+00

16th surface

K = −0.7654,
A2 = 0.0000E+00, A4 = 6.6618E−04, A6 = −1.8971E−05, A8 = 3.6530E−06,
A10 = 0.0000E+00

20th surface

K = −0.5416,
A2 = 0.0000E+00, A4 = −5.5470E−05, A6 = 6.2894E−06, A8 = −2.3499E−07,
A10 = 0.0000E+00

-continued

| Unit mm | | | |
|---|---|---|---|
| Numerical data | | | |
| Zoom ratio | | | |
| | WE | ST | TE |
| Focal length | 6.05144 | 13.53892 | 29.96069 |
| Fno. | 3.5153 | 3.9369 | 5.9000 |
| Image angle | 36.7° | 15.5° | 7.1° |
| Image height | 3.84 | 3.84 | 3.84 |
| Total lens length | 55.0020 | 55.0034 | 55.0034 |
| BF | 0.50052 | 0.52520 | 0.50164 |
| d8 | 0.69759 | 5.66725 | 8.06683 |
| d13 | 8.76403 | 3.78602 | 1.39487 |
| d14 | 6.71328 | 5.41478 | 1.19762 |
| d19 | 3.72701 | 4.24678 | 12.64233 |
| d21 | 4.89961 | 5.65635 | 1.50013 |

| Zoom lens group data | | |
|---|---|---|
| Group | Initial surface | Focal length |
| 1 | 1 | 13.15338 |
| 2 | 9 | −6.83078 |
| 3 | 15 | 11.53256 |
| 4 | 20 | 25.02405 |
| 5 | 22 | −52.78720 |

| Table of index of glass material | List of index per wavelength of medium used in the present embodiment | | | | |
|---|---|---|---|---|---|
| GLA | 587.56 | 656.27 | 486.13 | 435.84 | 404.66 |
| L7 | 1.729996 | 1.718099 | 1.762336 | 1.793147 | 1.822977 |
| L1, L2, L12 | 2.143520 | 2.125601 | 2.189954 | 2.232324 | 2.273190 |
| L13 | 1.516330 | 1.513855 | 1.521905 | 1.526213 | 1.529768 |
| L14 | 1.516330 | 1.513855 | 1.521905 | 1.526213 | 1.529768 |
| L4 | 1.806098 | 1.800248 | 1.819945 | 1.831173 | 1.840781 |
| L8 | 1.834807 | 1.828975 | 1.848520 | 1.859547 | 1.868911 |
| L5 | 1.816000 | 1.810749 | 1.828252 | 1.837996 | 1.846185 |
| L6 | 1.693501 | 1.689548 | 1.702582 | 1.709715 | 1.715662 |
| L9 | 1.696797 | 1.692974 | 1.705522 | 1.712339 | 1.718005 |
| L3 | 1.743198 | 1.738653 | 1.753716 | 1.762046 | 1.769040 |
| L10 | 2.000690 | 1.989410 | 2.028720 | 2.052834 | 2.074603 |
| L11 | 1.525400 | 1.522460 | 1.531800 | 1.537220 | 1.543549 |

| Aspheric amount of each surface | | | |
|---|---|---|---|
| 13th surface | | | |
| Y | ASP | SPH | ΔzA(h) |
| 2.031 | 0.01074 | 0.01138 | −0.00063 |
| 11th surface | | | |
| Y | ASP | SPH | ΔzB(h) |
| 2.031 | −0.13622 | −0.13637 | 0.00016 |
| 12th surface | | | |
| Y | ASP | SPH | ΔzC(h) |
| 2.031 | 0.18640 | 0.19270 | −0.00630 |

Example 2

| | | Unit mm | | |
|---|---|---|---|---|
| | | Surface data | | |
| Surface no. | r | d | nd | vd |
| Object plane | ∞ | ∞ | | |
| 1 | 55.7076 | 1.0000 | 2.14352 | 17.77 |
| 2 | 13.0680 | 1.7000 | | |
| 3 | ∞ | 9.8000 | 2.14352 | 17.77 |
| 4 | ∞ | 0.2000 | | |
| 5* | 35.2628 | 2.2000 | 1.74320 | 49.34 |
| 6 | −25.7069 | 0.1500 | | |
| 7 | 18.3036 | 1.8000 | 1.80610 | 40.92 |
| 8 | −148.8809 | Variable | | |
| 9 | −28.2459 | 0.5000 | 1.81600 | 46.62 |
| 10 | 11.7462 | 0.9000 | | |
| 11* | −15.5515 | 0.5000 | 1.73000 | 16.50 |
| 12* | −6.7295 | 0.6000 | 1.69350 | 53.21 |
| 13* | 108.3870 | Variable | | |
| 14(Stop) | ∞ | Variable | | |
| 15* | 6.2601 | 2.5000 | 1.83481 | 42.71 |
| 16* | −19.9479 | 0.1500 | | |
| 17 | 11.7692 | 1.6000 | 1.69680 | 55.53 |
| 18 | −22.5257 | 0.5000 | 2.00069 | 25.46 |
| 19 | 4.5015 | Variable | | |
| 20* | 9.2714 | 1.6000 | 1.52540 | 56.25 |
| 21 | 29.6154 | Variable | | |
| 22 | 72.3506 | 0.6000 | 2.14352 | 17.77 |
| 23 | 11.1612 | 2.0000 | 1.51633 | 64.14 |
| 24 | −17.0899 | 0.6000 | | |
| 25 | ∞ | 0.8000 | 1.51633 | 64.14 |
| 26 | ∞ | 0.4994 | | |
| Image plane(Light receiving surface) ∞ | | | | |

Aspherical surface data

5th surface $K = -0.3222$,
$A2 = 0.0000E+00, A4 = 8.2067E-06, A6 = 7.9299E-08, A8 = -6.6598E-10$,
$A10 = 0.0000E+00$ 11th surface $K = -0.1881$,
$A2 = 0.0000E+00, A4 = 1.0254E-04, A6 = -8.9315E-05, A8 = 4.8255E-06$,
$A10 = 0.0000E+00$ 12th surface $K = -0.3428$,
$A2 = 0.0000E+00, A4 = -1.7797E-04, A6 = 3.3674E-06, A8 = 0.0000E+00$,
$A10 = 0.0000E+00$ 13th surface $K = -0.1944$,
$A2 = 0.0000E+00, A4 = 3.5521E-05, A6 = -8.4873E-05, A8 = 5.2852E-06$,
$A10 = 0.0000E+00$ 15th surface $K = -0.5903$,
$A2 = 0.0000E+00, A4 = 6.5968E-05, A6 = -7.8382E-06, A8 = 1.8797E-06$,
$A10 = 0.0000E+00$ 16th surface $K = -0.7555$,
$A2 = 0.0000E+00, A4 = 6.7280E-04, A6 = -1.7143E-05, A8 = 2.7781E-06$,
$A10 = 0.0000E+00$ 20th surface $K = -0.7057$,
$A2 = 0.0000E+00, A4 = -4.2663E-06, A6 = 5.2093E-06, A8 = -1.6788E-07$,
$A10 = 0.0000E+00$ -continued Unit mm Numerical data Zoom ratio

| | WE | ST | TE |
|---|---|---|---|
| Focal length | 6.04800 | 13.53592 | 29.95806 |
| Fno. | 3.6236 | 4.0642 | 5.9000 |
| Image angle | 36.8° | 15.5° | 7.1° |
| Image height | 3.84 | 3.84 | 3.84 |
| Total lens length | 55.0000 | 54.9987 | 54.9998 |
| BF | 0.49939 | 0.52254 | 0.49908 |
| d8 | 0.69996 | 5.50353 | 7.99299 |
| d13 | 8.68986 | 3.88513 | 1.39688 |
| d14 | 6.41501 | 5.12517 | 1.19915 |
| d19 | 4.02302 | 4.25448 | 12.71186 |
| d21 | 4.97272 | 6.00781 | 1.49982 |

Zoom lens group data

| Group | Initial surface | Focal length |
|---|---|---|
| 1 | 1 | 12.80838 |
| 2 | 9 | −6.58576 |
| 3 | 15 | 11.53128 |
| 4 | 20 | 25.01071 |
| 5 | 22 | −118.18263 |

| Table of index of glass material | List of index per wavelength of medium used in the present embodiment | | | | |
|---|---|---|---|---|---|
| GLA | 587.56 | 656.27 | 486.13 | 435.84 | 404.66 |
| L6 | 1.729996 | 1.718099 | 1.762336 | 1.793147 | 1.822977 |
| L1, L2, L12 | 2.143520 | 2.125601 | 2.189954 | 2.232324 | 2.273190 |
| L13 | 1.516330 | 1.513855 | 1.521905 | 1.526213 | 1.529768 |
| L14 | 1.516330 | 1.513855 | 1.521905 | 1.526213 | 1.529768 |
| L4 | 1.806098 | 1.800248 | 1.819945 | 1.831173 | 1.840781 |
| L8 | 1.834807 | 1.828975 | 1.848520 | 1.859547 | 1.868911 |
| L5 | 1.816000 | 1.810749 | 1.828252 | 1.837996 | 1.846185 |
| L7 | 1.693501 | 1.689548 | 1.702582 | 1.709715 | 1.715662 |
| L9 | 1.696797 | 1.692974 | 1.705522 | 1.712339 | 1.718005 |
| L3 | 1.743198 | 1.738653 | 1.753716 | 1.762046 | 1.769040 |
| L10 | 2.000690 | 1.989410 | 2.028720 | 2.052834 | 2.074603 |
| L11 | 1.525400 | 1.522460 | 1.531800 | 1.537220 | 1.543549 |

Aspheric amount of each surface

11th surface

| Y | ASP | SPH | $\Delta zA(h)$ |
|---|---|---|---|
| 2.033 | −0.13649 | −0.13346 | −0.00304 |

13th surface

| Y | ASP | SPH | $\Delta zB(h)$ |
|---|---|---|---|
| 2.033 | 0.01522 | 0.01907 | −0.00384 |

12th surface

| Y | ASP | SPH | $\Delta zC(h)$ |
|---|---|---|---|
| 2.033 | −0.31464 | −0.31443 | −0.00020 |

Example 3

| | | Unit mm | | |
|---|---|---|---|---|
| | | Surface data | | |
| Surface no. | r | d | nd | vd |
| Object plane | ∞ | ∞ | | |
| 1 | 22.4929 | 1.0000 | 2.14352 | 17.77 |
| 2 | 11.8604 | 2.8000 | | |
| 3 | ∞ | 10.8000 | 1.80610 | 40.92 |
| 4 | ∞ | 0.2000 | | |
| 5* | 13.1837 | 2.3000 | 1.74320 | 49.34 |
| 6* | −34.1727 | Variable | | |
| 7 | −316.4678 | 0.5000 | 1.83481 | 42.71 |
| 8 | 9.5184 | 1.3000 | | |
| 9* | −16.5834 | 0.5000 | 1.72916 | 54.68 |
| 10* | 15.7202 | 0.5000 | 1.73000 | 15.00 |
| 11* | 4390.5344 | Variable | | |
| 12 | 22.7499 | 0.8000 | 1.51633 | 64.14 |
| 13 | −41.8739 | 0.6000 | | |
| 14(Stop) | ∞ | Variable | | |
| 15* | 11.0409 | 2.5000 | 1.83481 | 42.71 |
| 16* | −87.1887 | 0.1500 | | |
| 17 | 8.3163 | 1.6000 | 1.69680 | 55.53 |
| 18 | −83.3582 | 0.5000 | 2.00069 | 25.46 |
| 19 | 6.5305 | Variable | | |
| 20* | 10.4612 | 1.6000 | 1.52540 | 56.25 |
| 21 | −30.7284 | Variable | | |
| 22 | −34.9221 | 0.8000 | 1.63259 | 23.27 |
| 23 | 8.3820 | 1.8000 | | |
| 24 | ∞ | 0.8000 | 1.51633 | 64.14 |
| 25 | ∞ | 0.8013 | | |
| Image plane(Light receiving surface) | ∞ | | | |

Aspherical surface data

5th surface $K = 0.0639$,
$A2 = 0.0000E+00, A4 = −5.2118E−05, A6 = −4.6746E−07, A8 = −7.3018E−09, A10 = 0.0000E+00$ 6th surface $K = 0.0542$,
$A2 = 0.0000E+00, A4 = 4.8939E−06, A6 = −4.5994E−07, A8 = −4.8537E−10, A10 = 0.0000E+00$ 9th surface $K = −0.0576$,
$A2 = 0.0000E+00, A4 = −2.4174E−04, A6 = −9.7041E−06, A8 = 0.0000E+00, A10 = 0.0000E+00$ 10th surface $K = −0.2467$,
$A2 = 0.0000E+00, A4 = −4.8933E−04, A6 = −2.2127E−05, A8 = 0.0000E+00, A10 = 0.0000E+00$ 11th surface $K = −0.3437$,
$A2 = 0.0000E+00, A4 = −1.6342E−04, A6 = 2.6262E−08, A8 = 0.0000E+00, A10 = 0.0000E+00$ 15th surface $K = −0.6088$,
$A2 = 0.0000E+00, A4 = −1.1787E−04, A6 = 9.9248E−06, A8 = −9.4305E−07, A10 = 0.0000E+00$ 16th surface $K = −0.4441$,
$A2 = 0.0000E+00, A4 = −1.0911E−04, A6 = 7.9543E−06, A8 = −9.8771E−07, A10 = 0.0000E+00$ 20th surface $K = 0.0520$,
$A2 = 0.0000E+00, A4 = −1.1624E−04, A6 = −2.3382E−06, A8 = −9.5638E−08, A10 = 0.0000E+00$ -continued Unit mm Numerical data Zoom ratio

|  | WE | ST | TE |
|---|---|---|---|
| Focal length | 6.05548 | 13.53321 | 29.95656 |
| Fno. | 3.5665 | 4.6241 | 5.9000 |
| Image angle | 36.7° | 16.1° | 7.2° |
| Image height | 3.84 | 3.84 | 3.84 |
| Total lens length | 57.4874 | 57.4946 | 57.4858 |
| BF | 0.80129 | 0.77648 | 0.80031 |
| d6 | 0.50003 | 5.88301 | 8.94381 |
| d11 | 9.16210 | 3.81330 | 0.71775 |
| d14 | 9.52011 | 6.11522 | 1.30566 |
| d19 | 2.07348 | 5.14283 | 12.98956 |
| d21 | 4.38036 | 4.71375 | 1.67870 |

Zoom lens group data

| Group | Initial surface | Focal length |
|---|---|---|
| 1 | 1 | 16.03065 |
| 2 | 7 | −7.15759 |
| 3 | 12 | 28.67063 |
| 4 | 15 | 20.43478 |
| 5 | 20 | 15.05548 |
| 6 | 22 | −10.60960 |

| Table of index of glass material | List of index per wavelength of medium used in the present embodiment | | | |
|---|---|---|---|---|
| GLA | 587.56 | 656.27 | 486.13 | 435.84 | 404.66 |
| L6 | 1.729995 | 1.717097 | 1.765757 | 1.800589 | 1.834836 |
| L12 | 1.632590 | 1.624940 | 1.652120 | 1.669410 | 1.685501 |
| L1 | 2.143520 | 2.125601 | 2.189954 | 2.232324 | 2.273184 |
| L7 | 1.516330 | 1.513855 | 1.521905 | 1.526213 | 1.529768 |
| L13 | 1.516330 | 1.513855 | 1.521905 | 1.526213 | 1.529768 |
| L2 | 1.806098 | 1.800248 | 1.819945 | 1.831173 | 1.840781 |
| L4, L8 | 1.834807 | 1.828975 | 1.848520 | 1.859547 | 1.868911 |
| L9 | 1.696797 | 1.692974 | 1.705522 | 1.712339 | 1.718005 |
| L5 | 1.729157 | 1.725101 | 1.738436 | 1.745696 | 1.751731 |
| L3 | 1.743198 | 1.738653 | 1.753716 | 1.762046 | 1.769040 |
| L10 | 2.000690 | 1.989410 | 2.028720 | 2.052834 | 2.074600 |
| L11 | 1.525400 | 1.522460 | 1.531800 | 1.537220 | 1.543548 |

Aspheric amount of each surface

| Y | ASP | SPH | ΔzA (h) |
|---|---|---|---|
| 11th surface | | | |
| 2.029 | −0.00230 | 0.00047 | −0.00277 |
| 9th surface | | | |
| 2.029 | −0.12934 | −0.12459 | −0.00475 |
| 10th surface | | | |
| 2.029 | 0.12152 | 0.13149 | −0.00997 |

Example 4

Unit mm

Surface data

| Surface no. | r | d | nd | vd |
|---|---|---|---|---|
| Object plane | ∞ | ∞ | | |
| 1 | 20.5281 | 1.0000 | 2.14352 | 17.77 |
| 2 | 12.0604 | 2.8000 | | |
| 3 | ∞ | 10.8000 | 1.80610 | 40.92 |

-continued

Unit mm

| | | | | |
|---|---|---|---|---|
| 4 | ∞ | 0.2000 | | |
| 5* | 13.4550 | 2.3000 | 1.74320 | 49.34 |
| 6* | −36.2822 | Variable | | |
| 7 | −28.0520 | 0.5000 | 1.83481 | 42.71 |
| 8 | 8.4998 | 1.2000 | | |
| 9* | −20.0212 | 0.6000 | 1.67000 | 20.00 |
| 10* | −6.7404 | 0.5000 | 1.72916 | 54.68 |
| 11* | −30.4233 | Variable | | |
| 12 | 24.9565 | 0.8000 | 1.51633 | 64.14 |
| 13 | −36.4286 | 0.6000 | | |
| 14(Stop) | ∞ | Variable | | |
| 15* | 9.8269 | 2.5000 | 1.83481 | 42.71 |
| 16* | −84.5687 | 0.1500 | | |
| 17 | 8.4458 | 2.0000 | 1.69680 | 55.53 |
| 18 | −32.1844 | 0.5000 | 2.00069 | 25.46 |
| 19 | 6.1370 | Variable | | |
| 20* | 13.3585 | 1.6000 | 1.52540 | 56.25 |
| 21 | −46.6158 | Variable | | |
| 22* | 71.2505 | 1.0000 | 1.63259 | 23.27 |
| 23 | 9.0461 | Variable | | |
| 24 | ∞ | 1.8000 | 1.51633 | 64.14 |
| 25 | ∞ | 0.8005 | | |
| Image plane(Light receiving surface) | ∞ | | | |

Aspherical surface data

5th surface

K = 0.0768,
A2 = 0.0000E+00, A4 = −2.4964E−05, A6 = −7.7451E−07, A8 = −1.1331E−08, A10 = 0.0000E+00

6th surface

K = −0.0524,
A2 = 0.0000E+00, A4 = 3.1179E−05, A6 = −1.2240E−06, A8 = −2.0781E−09, A10 = 0.0000E+00

9th surface

K = −0.0823,
A2 = 0.0000E+00, A4 = 1.5514E−04, A6 = −5.5201E−05, A8 = 0.0000E+00, A10 = 0.0000E+00

10th surface

K = −0.0919,
A2 = 0.0000E+00, A4 = 2.9372E−04, A6 = −3.7688E−05, A8 = 0.0000E+00, A10 = 0.0000E+00

11th surface

K = −0.3096,
A2 = 0.0000E+00, A4 = −3.1464E−05, A6 = −3.7095E−05, A8 = 0.0000E+00, A10 = 0.0000E+00

15th surface

K = −0.6096,
A2 = 0.0000E+00, A4 = 6.4335E−05, A6 = 1.4007E−05, A8 = −9.0504E−07, A10 = 0.0000E+00

16th surface

K = −0.5523,
A2 = 0.0000E+00, A4 = 1.4466E−04, A6 = 1.4448E−05, A8 = −1.1717E−06, A10 = 0.0000E+00

20th surface

K = 0.0543,
A2 = 0.0000E+00, A4 = −6.5330E−05, A6 = 7.7179E−07, A8 = −2.3240E−07, A10 = 0.0000E+00

22nd surface

K = −0.0103,
A2 = 0.0000E+00, A4 = −1.4321E−04, A6 = 5.2212E−06, A8 = 0.0000E+00, A10 = 0.0000E+00

Numerical data

Zoom ratio

| | WE | ST | TE |
|---|---|---|---|
| Focal length | 6.05725 | 13.52739 | 29.95829 |
| Fno. | 3.5829 | 4.4047 | 5.9000 |
| Focal length | 36.7° | 16.0° | 7.2° |
| Image height | 3.84 | 3.84 | 3.84 |
| Total lens length | 57.4904 | 57.5180 | 57.4891 |
| BF | 0.80050 | 0.77498 | 0.79964 |
| d6 | 0.49899 | 5.37364 | 8.69148 |
| d11 | 8.90870 | 4.11636 | 0.71566 |
| d14 | 9.38194 | 5.38462 | 1.30302 |

-continued

Unit mm

| | | | |
|---|---|---|---|
| d19 | 2.15831 | 5.76818 | 12.62834 |
| d21 | 4.09198 | 4.45024 | 1.70094 |

Zoom lens group data

| Group | Initial surface | Focal length |
|---|---|---|
| 1 | 1 | 16.37523 |
| 2 | 7 | −6.76290 |
| 3 | 12 | 28.81162 |
| 4 | 15 | 18.02077 |
| 5 | 20 | 19.94552 |
| 6 | 22 | −16.48228 |

Table of index of glass material

List of index per wavelength of medium used in the present embodiment

| GLA | 587.56 | 656.27 | 486.13 | 435.84 | 404.66 |
|---|---|---|---|---|---|
| L5 | 1.669997 | 1.660803 | 1.694299 | 1.716730 | 1.737950 |
| L12 | 1.632590 | 1.624940 | 1.652120 | 1.669410 | 1.685501 |
| L1 | 2.143520 | 2.125601 | 2.189954 | 2.232324 | 2.273184 |
| L7 | 1.516330 | 1.513855 | 1.521905 | 1.526213 | 1.529768 |
| L13 | 1.516330 | 1.513855 | 1.521905 | 1.526213 | 1.529768 |
| L2 | 1.806098 | 1.800248 | 1.819945 | 1.831173 | 1.840781 |
| L4, L8 | 1.834807 | 1.828975 | 1.848520 | 1.859547 | 1.868911 |
| L9 | 1.696797 | 1.692974 | 1.705522 | 1.712339 | 1.718005 |
| l6 | 1.729157 | 1.725101 | 1.738436 | 1.745696 | 1.751731 |
| L3 | 1.743198 | 1.738653 | 1.753716 | 1.762046 | 1.769040 |
| L10 | 2.000690 | 1.989410 | 2.028720 | 2.052834 | 2.074600 |
| L11 | 1.525400 | 1.522460 | 1.531800 | 1.537220 | 1.543548 |

Aspheric amount of each surface

9th surface

| Y | ASP | SPH | $\Delta zA$ (h) |
|---|---|---|---|
| 2.028 | −0.10417 | −0.10298 | −0.00119 |

11th surface

| Y | ASP | SPH | $\Delta zB$ (h) |
|---|---|---|---|
| 2.028 | −0.07076 | −0.06767 | −0.00309 |

10th surface

| Y | ASP | SPH | $\Delta zC$ (h) |
|---|---|---|---|
| 2.028 | −0.30928 | −0.31232 | 0.00304 |

Example 5

Unit mm

Surface data

| Surface no. | r | d | nd | νd |
|---|---|---|---|---|
| Object plane | ∞ | ∞ | | |
| 1 | 26.5979 | 1.0000 | 2.14352 | 17.77 |
| 2 | 10.3157 | 2.0000 | | |
| 3 | ∞ | 9.8000 | 2.14352 | 17.77 |
| 4 | ∞ | 0.2000 | | |
| 5* | 40.8381 | 0.1000 | 1.63494 | 23.22 |
| 6* | 23.7933 | 2.4000 | 1.80610 | 40.92 |
| 7* | −30.1715 | 0.1500 | | |
| 8 | 19.1130 | 1.8000 | 1.80610 | 40.92 |
| 9 | −119.8394 | Variable | | |
| 10 | −34.9794 | 0.5000 | 1.81600 | 46.62 |
| 11 | 10.9296 | 0.9000 | | |
| 12* | −14.6930 | 0.6000 | 1.69350 | 53.21 |

-continued

| | | Unit mm | | |
|---|---|---|---|---|
| 13* | 8.7042 | 0.5000 | 1.73000 | 16.50 |
| 14* | 37.7922 | Variable | | |
| 15(Stop) | ∞ | 0.7000 | | |
| 16 | 22.5727 | 1.0000 | 1.58913 | 61.14 |
| 17 | −41.7124 | Variable | | |
| 18* | 9.5707 | 2.5000 | 1.83481 | 42.71 |
| 19* | −37.8300 | 0.1500 | | |
| 20 | 16.6509 | 1.6000 | 1.69680 | 55.53 |
| 21 | −18.9290 | 0.5000 | 2.00069 | 25.46 |
| 22 | 8.3709 | Variable | | |
| 23* | 12.6634 | 1.6000 | 1.52540 | 56.25 |
| 24 | −58.3642 | Variable | | |
| 25 | −7.6262 | 0.6000 | 2.14352 | 17.77 |
| 26 | −15.2919 | 2.0000 | 1.51633 | 64.14 |
| 27 | −7.0092 | 0.6000 | | |
| 28 | ∞ | 0.8000 | 1.51633 | 64.14 |
| 29 | ∞ | 0.8000 | | |
| Image plane(Light receiving surface) | ∞ | | | |

Aspherical surface data

5th surface

K = −0.3194,
A2 = 0.0000E+00, A4 = 5.2239−05, A6 = −3.8234E−06, A8 = 6.4660E−08, A10 = 0.0000E+00

6th surface

K = 0.1028,
A2 = 0.0000E+00, A4 = −9.5972E−05, A6 = 1.0792E−05, A8 = −2.9962E−07, A10 = 0.0000E+00

7th surface

K = −0.0611,
A2 = 0.0000E+00, A4 = 1.4691E−07, A6 = −8.1251−07, A8 = −1.2322E−08, A10 = 0.0000E+00

12th surface

K = −0.3278,
A2 = 0.0000E+00, A4 = 9.7162E−04, A6 = −1.2498E−04, A8 = 5.4205E−06, A10 = 0.0000E+00

13th surface

K = −1.0249,
A2 = 0.0000E+00, A4 = 4.0110E−04, A6 = −1.7438E−06, A8 = 0.0000E+00, A10 = 0.0000E+00

14th surface

K = 2.5100,
A2 = 0.0000E+00, A4 = 7.0971E−04, A6 = −8.9379E−05, A8 = 4.2930E−06, A10 = 0.0000E+00

18th surface

K = −0.5992,
A2 = 0.0000E+00, A4 = 3.9914E−05, A6 = 2.4558E−05, A8 = −1.1059E−06, A10 = 0.0000E+00

19th surface

K = −0.7493,
A2 = 0.0000E+00, A4 = 2.1838E−04, A6 = 2.7442E−05, A8 = −1.3651E−06, A10 = 0.0000E+00

23rd surface

K = −0.6951,
A2 = 0.0000E+00, A4 = −1.8452E−05, A6 = 1.1428E−05, A8 = −3.9082E−07, A10 = 0.0000E+00

Numerical data

Zoom ratio

| | WE | ST | TE |
|---|---|---|---|
| Focal length | 6.05251 | 13.53423 | 29.95844 |
| Fno. | 3.9438 | 4.3590 | 5.9000 |
| Focal length | 36.1° | 16.0° | 7.2° |
| Image height | 3.84 | 3.84 | 3.84 |
| Total lens length | 58.3597 | 58.3635 | 58.3593 |
| BF | 0.80002 | 0.79863 | 0.79966 |
| d9 | 0.59715 | 5.39994 | 8.16582 |
| d14 | 8.86423 | 4.06909 | 1.29558 |
| d17 | 7.17325 | 4.71443 | 0.69992 |
| d22 | 3.54306 | 4.86863 | 13.89888 |
| d24 | 5.38194 | 6.51275 | 1.49945 |

-continued

Unit mm

Zoom lens group data

| Group | Initial surface | Focal length |
|---|---|---|
| 1 | 1 | 12.89848 |
| 2 | 10 | −5.94074 |
| 3 | 15 | 25.00570 |
| 4 | 18 | 20.94305 |
| 5 | 23 | 19.96014 |
| 6 | 25 | −49.90709 |

Table of index of glass material — List of index per wavelength of medium used in the present embodiment

| GLA | 587.56 | 656.27 | 486.13 | 435.84 | 404.66 |
|---|---|---|---|---|---|
| L3 | 1.634937 | 1.627308 | 1.654649 | 1.672358 | 1.688773 |
| L8 | 1.729996 | 1.718099 | 1.762336 | 1.793147 | 1.822977 |
| L1, L2, L14 | 2.143520 | 2.125601 | 2.189954 | 2.232324 | 2.273190 |
| L9 | 1.589130 | 1.586188 | 1.595824 | 1.601033 | 1.605348 |
| L15 | 1.516330 | 1.513855 | 1.521905 | 1.526213 | 1.529768 |
| L16 | 1.516330 | 1.513855 | 1.521905 | 1.526213 | 1.529768 |
| L4, L5 | 1.806098 | 1.800248 | 1.819945 | 1.831173 | 1.840781 |
| L10 | 1.834807 | 1.828975 | 1.848520 | 1.859547 | 1.868911 |
| L6 | 1.816000 | 1.810749 | 1.828252 | 1.837996 | 1.846185 |
| L7 | 1.693501 | 1.689548 | 1.702582 | 1.709715 | 1.715662 |
| L11 | 1.696797 | 1.692974 | 1.705522 | 1.712339 | 1.718005 |
| L12 | 2.000690 | 1.989410 | 2.028720 | 2.052834 | 2.074603 |
| L13 | 1.525400 | 1.522460 | 1.531800 | 1.537220 | 1.543549 |

Aspheric amount of each surface

14th surface

| Y | ASP | SPH | ΔzA (h) |
|---|---|---|---|
| 2.031 | 0.06176 | 0.05461 | 0.00715 |

12th surface

| Y | ASP | SPH | ΔzB (h) |
|---|---|---|---|
| 2.031 | −0.13150 | −0.14105 | 0.00955 |

13th surface

| Y | ASP | SPH | ΔzC (h) |
|---|---|---|---|
| 2.031 | 0.24357 | 0.24027 | 0.00331 |

Example 6

Unit mm

Surface data

| Surface no. | r | d | nd | νd |
|---|---|---|---|---|
| Object plane | ∞ | ∞ | | |
| 1 | 30.3910 | 1.0000 | 2.14352 | 17.77 |
| 2 | 13.5976 | 1.7000 | | |
| 3 | ∞ | 9.6000 | 2.14352 | 17.77 |
| 4 | ∞ | 0.2000 | | |
| 5* | 11.5857 | 2.8000 | 1.74320 | 49.34 |
| 6 | −32.6264 | Variable | | |
| 7 | −39.9777 | 0.5000 | 1.80400 | 46.57 |
| 8 | 11.2151 | 0.5000 | | |
| 9 | −28.1638 | 0.5000 | 1.78800 | 47.37 |
| 10 | 19.2484 | 0.3000 | | |
| 11* | −38.5437 | 0.5000 | 1.74320 | 49.34 |
| 12* | 4.6656 | 0.6000 | 1.63494 | 23.22 |
| 13* | 71.1905 | Variable | | |
| 14(Stop) | ∞ | 0.8000 | | |

-continued

| Unit mm | | | | |
|---|---|---|---|---|
| 15* | 9.8898 | 1.5000 | 1.51633 | 64.14 |
| 16 | −40.2680 | Variable | | |
| 17* | 21.4850 | 1.8000 | 1.74320 | 49.34 |
| 18 | −8.1813 | 0.5000 | 1.80810 | 22.76 |
| 19 | −13.3475 | Variable | | |
| 20 | −39.7361 | 0.6000 | 2.14352 | 17.77 |
| 21 | 19.8516 | 6.8877 | | |
| 22* | 8.6297 | 1.2000 | 1.52540 | 56.25 |
| 23 | 13.1843 | 0.8000 | | |
| 24 | ∞ | 0.8000 | 1.51633 | 64.14 |
| 25 | ∞ | 0.7991 | | |
| Image plane(Light receiving surface) | ∞ | | | |

Aspherical surface data

5th surface

K = 0.0243*
A2 = 0.0000E+00, A4 = −9.1244E−05, A6 = −3.7178E−07, A8 = −3.9647E−09, A10 = 0.0000E+00

11th surface

K = −0.1843*
A2 = 0.0000E+00, A4 = −1.1146E−03, A6 = 4.7121E−05, A8 = 0.0000E+00, A10 = 0.0000E+00

12th surface

K = 0.0714*
A2 = 0.0000E+00, A4 = −4.2209E−03, A6 = 4.4168E−05, A8 = 0.0000E+00, A10 = 0.0000E+00

13th surface

K = 0.5031*
A2 = 0.0000E+00, A4 = −7.5156E−04, A6 = 4.1221E−05, A8 = 0.0000E+00, A10 = 0.0000E+00

15th surface

K = 0.0634*
A2 = 0.0000E+00, A4 = −2.4934E−04, A6 = −8.7233E−06, A8 = 6.1977E−07, A10 = 0.0000E+00

17th surface

K = −0.0468*
A2 = 0.0000E+00, A4 = −2.9090E−04, A6 = 3.0716E−06, A8 = −1.8078E−07, A10 = 0.0000E+00

22nd surface

K = −0.0707*
A2 = 0.0000E+00, A4 = 6.1310E−05, A6 = −1.2661E−05, A8 = −2.2403E−07, A10 = 0.0000E+00

Numerical data

Zoom ratio

| | WE | ST | TE |
|---|---|---|---|
| Focal length | 6.05037 | 13.53494 | 29.95708 |
| Fno. | 3.9500 | 4.2591 | 4.7185 |
| Focal length | 36.7° | 16.0° | 7.2° |
| Image height | 3.84 | 3.84 | 3.84 |
| Total lens length | 55.7658 | 55.7655 | 55.7653 |
| BF | 0.79915 | 0.80123 | 0.79862 |
| d6 | 0.60257 | 5.45240 | 8.89017 |
| d13 | 9.68706 | 4.83260 | 1.39936 |
| d16 | 5.84608 | 3.55253 | 1.60848 |
| d19 | 4.01764 | 6.31346 | 8.25538 |

Zoom lens group data

| Group | Initial surface | Focal length |
|---|---|---|
| 1 | 1 | 15.61973 |
| 2 | 7 | −4.40764 |
| 3 | 14 | 15.53561 |
| 4 | 17 | 11.78249 |
| 5 | 20 | −18.96823 |

| Table of index of glass material | List of index per wavelength of medium used in the present embodiment | | | | |
|---|---|---|---|---|---|
| GLA | 587.56 | 656.27 | 486.13 | 435.84 | 404.66 |
| L12 | 1.525399 | 1.522577 | 1.531916 | 1.537043 | 1.541302 |
| L7 | 1.634937 | 1.627308 | 1.654649 | 1.672358 | 1.688770 |
| L1, L2, L11 | 2.143520 | 2.125601 | 2.189954 | 2.232324 | 2.273184 |

-continued

| Unit mm | | | | | |
|---|---|---|---|---|---|
| L8 | 1.516330 | 1.513855 | 1.521905 | 1.526213 | 1.529768 |
| L13 | 1.516330 | 1.513855 | 1.521905 | 1.526213 | 1.529768 |
| L5 | 1.788001 | 1.782998 | 1.799634 | 1.808881 | 1.816664 |
| L4 | 1.804000 | 1.798815 | 1.816080 | 1.825698 | 1.833800 |
| L3, L6, L9 | 1.743198 | 1.738653 | 1.753716 | 1.762046 | 1.769040 |
| L10 | 1.808095 | 1.798009 | 1.833513 | 1.855902 | 1.876580 |

Aspheric amount of each surface

13th surface

| Y | ASP | SPH | $\Delta zA$ (h) |
|---|---|---|---|
| 2.032 | 0.01910 | 0.02901 | −0.00991 |

11th surface

| Y | ASP | SPH | $\Delta zB$ (h) |
|---|---|---|---|
| 2.032 | −0.06928 | −0.05360 | −0.01568 |

12th surface

| Y | ASP | SPH | $\Delta zC$ (h) |
|---|---|---|---|
| 2.032 | 0.39874 | 0.46574 | −0.06700 |

Example 7

| Unit mm | | | | |
|---|---|---|---|---|
| Surface data | | | | |
| Surface no. | r | d | nd | νd |
| Object plane | ∞ | ∞ | | |
| 1 | 23.4164 | 1.0000 | 2.14352 | 17.77 |
| 2 | 12.3685 | 2.1000 | | |
| 3 | ∞ | 9.6000 | 2.14352 | 17.77 |
| 4 | ∞ | 0.2000 | | |
| 5* | 12.0161 | 2.8000 | 1.74320 | 49.34 |
| 6 | −31.4829 | Variable | | |
| 7 | −77.7833 | 0.5000 | 1.80400 | 46.57 |
| 8 | 9.2558 | 0.6000 | | |
| 9 | −24.7186 | 0.5000 | 1.78800 | 47.37 |
| 10 | 14.6147 | 0.4000 | | |
| 11* | −59.5793 | 0.5000 | 1.63494 | 23.20 |
| 12* | −5.7050 | 0.5000 | 1.74320 | 49.34 |
| 13* | 113.3954 | Variable | | |
| 14(Stop) | ∞ | 0.8000 | | |
| 15* | 10.2399 | 1.5000 | 1.51633 | 64.14 |
| 16 | −21.7225 | Variable | | |
| 17* | 20.7012 | 1.8000 | 1.74320 | 49.34 |
| 18 | −10.1660 | 0.5000 | 1.80810 | 22.76 |
| 19 | −15.5823 | Variable | | |
| 20 | −27.6698 | 0.6000 | 2.14352 | 17.77 |
| 21 | 14.3453 | 6.8520 | | |
| 22* | 7.6257 | 2.5000 | 1.52540 | 56.25 |
| 23 | −356.4985 | 2.5662 | | |
| 24 | ∞ | 0.8000 | 1.51633 | 64.14 |
| 25 | ∞ | 0.7990 | | |
| Image plane(Light receiving surface) | ∞ | | | |

Aspherical surface data

5th surface

K = 0.1210,
A2 = 0.0000E +00, A4 = −8.5962E−05, A6 = −3.3992E−07, A8 = −4.2756E−09, A10 = 0.0000E+00

-continued

Unit mm

11th surface

K = −0.3051,
A2 = 0.0000E+00, A4 = −9.0483E−04, A6 = −2.2287E−05, A8 = 0.0000E+00, A10 = 0.0000E+00

12th surface

K = 0.1584,
A2 = 0.0000E+00, A4 = −6.6068E−04, A6 = 1.8498E−04, A8 = 0.0000E+00, A10 = 0.0000E+00

13th surface

K = −0.3298,
A2 = 0.0000E+00, A4 = −7.7051E−04, A6 = 1.5196E−05, A8 = 0.0000E+00, A10 = 0.0000E+00

15th surface

K = 0.0634,
A2 = 0.0000E+00, A4 = −2.6975E−04, A6 = −4.7110E−06, A8 = 3.7159E−07, A10 = 0.0000E+00

17th surface

K = −0.1076,
A2 = 0.0000E+00, A4 = −2.4926E−04, A6 = 1.4555E−06, A8 = −1.1053E−07, A10 = 0.0000E+00

22nd surface

K = −0.0608,
A2 = 0.0000E+00, A4 = 6.2948E−05, A6 = −3.6443E−06, A8 = −2.5577E−08, A10 = 0.0000E+00

Numerical data

Zoom ratio

|  | WE | ST | TE |
| --- | --- | --- | --- |
| Focal length | 6.05519 | 13.53459 | 29.95973 |
| Fno. | 3.9500 | 4.1928 | 4.5607 |
| Focal length | 36.7° | 16.3° | 7.4° |
| Image height | 3.84 | 3.84 | 3.84 |
| Total lens length | 55.7658 | 55.7655 | 55.7653 |
| BF | 57.9956 | 57.9972 | 57.9957 |
| BF | 0.79899 | 0.80066 | 0.79932 |
| d6 | 0.59892 | 5.45780 | 8.88569 |
| d13 | 9.68983 | 4.83359 | 1.40293 |
| d16 | 6.29785 | 3.87810 | 1.99695 |
| d19 | 3.99180 | 6.40883 | 8.29263 |

Zoom lens group data

| Group | Initial surface | Focal length |
| --- | --- | --- |
| 1 | 1 | 15.46393 |
| 2 | 7 | −4.25546 |
| 3 | 14 | 13.69734 |
| 4 | 17 | 12.61596 |
| 5 | 20 | 124.67620 |

| Table of index of glass material | List of index per wavelength of medium used in the present embodiment | | | | |
| --- | --- | --- | --- | --- | --- |
| GLA | 587.56 | 656.27 | 486.13 | 435.84 | 404.66 |
| L12 | 1.525399 | 1.522577 | 1.531916 | 1.537043 | 1.541302 |
| L6 | 1.634937 | 1.627302 | 1.654667 | 1.672395 | 1.688828 |
| L1, L2, L11 | 2.143520 | 2.125601 | 2.189954 | 2.232324 | 2.273184 |
| L8 | 1.516330 | 1.513855 | 1.521905 | 1.526213 | 1.529768 |
| L13 | 1.516330 | 1.513855 | 1.521905 | 1.526213 | 1.529768 |
| L5 | 1.788001 | 1.782998 | 1.799634 | 1.808881 | 1.816664 |
| L4 | 1.804000 | 1.798815 | 1.816080 | 1.825698 | 1.833800 |
| L3, L7, L9 | 1.743198 | 1.738653 | 1.753716 | 1.762046 | 1.769040 |
| L10 | 1.808095 | 1.798009 | 1.833513 | 1.855902 | 1.876580 |

-continued

Unit mm

Aspheric amount of each surface

11th surface

| Y | ASP | SPH | ΔzA (h) |
|---|---|---|---|
| 2.029 | −0.05145 | −0.03456 | −0.01689 |

13th surface

| Y | ASP | SPH | ΔzB (h) |
|---|---|---|---|
| 2.029 | 0.00615 | 0.01815 | −0.01200 |

12th surface

| Y | ASP | SPH | ΔzC (h) |
|---|---|---|---|
| 2.029 | −0.37339 | −0.37301 | −0.00038 |

Further, numerical data (various data) are shown below:

| | Example1 | Example2 | Example3 | Example4 |
|---|---|---|---|---|
| fw | 6.051 | 6.048 | 6.055 | 6.057 |
| f2 | −6.831 | −6.586 | −7.158 | −6.763 |
| Y | 4.951 | 4.953 | 4.947 | 4.946 |
| $y_{10}$ | 3.84 | 3.84 | 3.84 | 3.84 |
| a | 1.693 | 1.694 | 1.691 | 1.690 |
| h (=1.2 a) | 2.031 | 2.033 | 2.029 | 2.028 |
| $\Delta z_A(h)$ | −0.00063 | −0.00304 | −0.00277 | −0.00119 |
| $\Delta z_B(h)$ | 0.00016 | −0.00384 | −0.00475 | −0.00309 |
| $\Delta z_C(h)$ | −0.00630 | −0.00020 | −0.00997 | 0.00304 |
| $\{\Delta z_A(h) + \Delta z_B(h)\}/2$ | −0.00024 | −0.00344 | −0.00376 | −0.00214 |
| $R_C$ | 10.7991 | −6.7295 | 15.7202 | −6.7404 |
| θgF(LA) | 0.6965 | 0.6965 | 0.7158 | 0.6697 |
| β(LA) | 0.7234 | 0.7234 | 0.7403 | 0.7023 |
| θhg(LA) | 0.6743 | 0.6743 | 0.7038 | 0.6335 |
| βhg(LA) | 0.7114 | 0.7114 | 0.7376 | 0.6785 |
| νd(LA) | 16.50 | 16.50 | 15.00 | 20.00 |
| nd(LA) | 1.73000 | 1.73000 | 1.73000 | 1.67000 |
| θgF(LB) | 0.5480 | 0.5480 | 0.5442 | 0.5442 |
| θhg(LB) | 0.4559 | 0.4559 | 0.4520 | 0.4520 |
| νd(LB) | 53.21 | 53.21 | 54.68 | 54.68 |
| nd(LB) | 1.69350 | 1.69350 | 1.72916 | 1.72916 |
| νd(LA) − νd(LB) | −36.71 | −36.71 | −39.68 | −34.68 |
| θgF(LA) − θgF(LB) | 0.1485 | 0.1485 | 0.1716 | 0.1255 |
| θhg(LA) − θhg(LB) | 0.2184 | 0.2184 | 0.2518 | 0.1815 |
| $z_A(h)$ | 0.01074 | −0.13649 | −0.00230 | −0.10417 |
| $z_C(h)$ | 0.18640 | −0.31464 | 0.12152 | −0.30928 |
| $|z_A(h) − z_C(h)|/tA$ | 0.35132 | 0.35630 | 0.24764 | 0.34185 |
| tA | 0.5 | 0.5 | 0.5 | 0.6 |
| tA/tB | 0.8333 | 0.8333 | 1.0000 | 1.2000 |
| $y_{07}$ | 2.688 | 2.688 | 2.688 | 2.688 |
| $\tan\omega_{07w}$ | 0.47747 | 0.47768 | 0.47958 | 0.47471 |
| $y_{07}/(fw \times \tan\omega_{07w})$ | 0.9304 | 0.9304 | 0.9257 | 0.9349 |

| | Example5 | Example6 | Example7 |
|---|---|---|---|
| fw | 6.053 | 6.050 | 6.055 |
| f2 | −5.941 | −4.408 | −4.255 |
| Y | 4.950 | 4.951 | 4.948 |
| $y_{10}$ | 3.84 | 3.84 | 3.84 |
| a | 1.692 | 1.693 | 1.691 |
| h (=1.2 a) | 2.031 | 2.032 | 2.029 |
| $\Delta z_A(h)$ | 0.00715 | −0.00991 | −0.01689 |
| $\Delta z_B(h)$ | 0.00955 | −0.01568 | −0.01200 |
| $\Delta z_C(h)$ | 0.00331 | −0.06700 | −0.00038 |
| $\{\Delta z_A(h) + \Delta z_B(h)\}/2$ | 0.00835 | −0.01280 | −0.01445 |
| $R_C$ | 8.7042 | 4.6656 | −5.7050 |
| θgF(LA) | 0.6965 | 0.6477 | 0.6478 |
| β(LA) | 0.7234 | 0.6855 | 0.6856 |
| θhg(LA) | 0.6743 | 0.6003 | 0.6005 |
| βhg(LA) | 0.7114 | 0.6525 | 0.6527 |
| νd(LA) | 16.50 | 23.22 | 23.20 |
| nd(LA) | 1.73000 | 1.63494 | 1.63494 |
| θgF(LB) | 0.5480 | 0.5528 | 0.5528 |
| θhg(LB) | 0.4559 | 0.4638 | 0.4638 |
| νd(LB) | 53.21 | 49.34 | 49.34 |
| nd(LB) | 1.69350 | 1.74320 | 1.74320 |
| νd(LA) − νd(LB) | −36.71 | −26.12 | −26.14 |
| θgF(LA) − θgF(LB) | 0.1485 | 0.0949 | 0.0950 |
| θhg(LA) − θhg(LB) | 0.2184 | 0.1365 | 0.1367 |
| $z_A(h)$ | 0.06176 | 0.01910 | −0.05145 |
| $z_C(h)$ | 0.24357 | 0.39874 | −0.37339 |
| $|z_A(h) − z_C(h)|/tA$ | 0.36362 | 0.63273 | 0.64388 |
| tA | 0.5 | 0.6 | 0.5 |
| tA/tB | 0.8333 | 1.2000 | 1.0000 |
| $y_{07}$ | 2.688 | 2.688 | 2.688 |
| $\tan\omega_{07w}$ | 0.47056 | 0.48574 | 0.48554 |
| $y_{07}/(fw \times \tan\omega_{07w})$ | 0.9437 | 0.9147 | 0.9143 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 15:
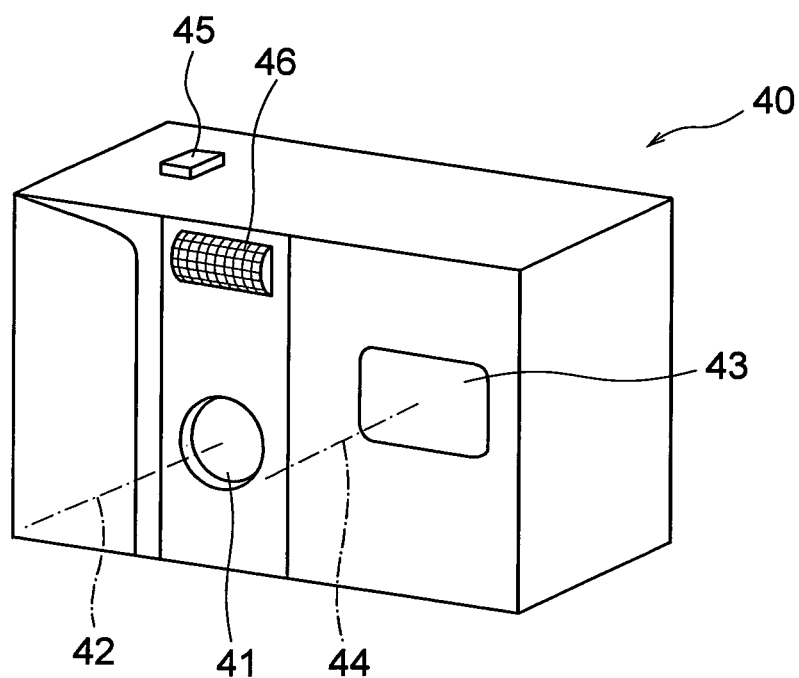
FIG. 15 is a front perspective view showing an outer appearance of a digital camera 40 equipped with a zoom optical system according to the present invention.
Figure 16:
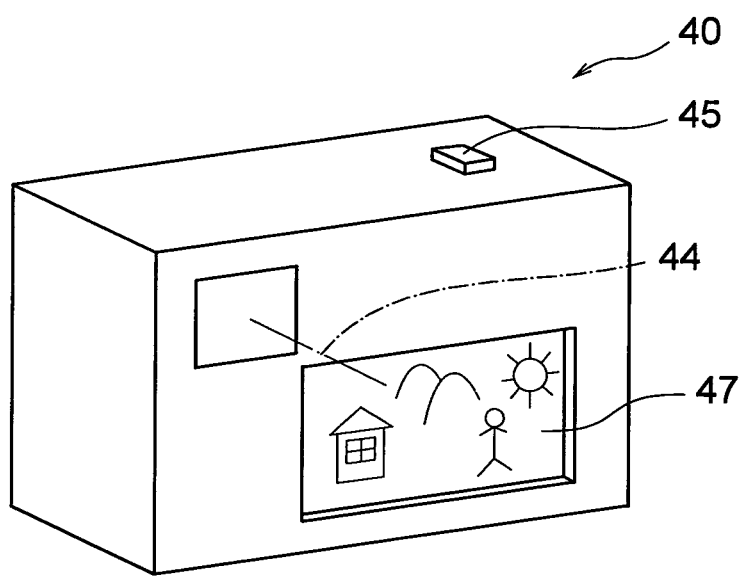
FIG. 16 is a rear perspective view of the digital camera 40.
Figure 17:
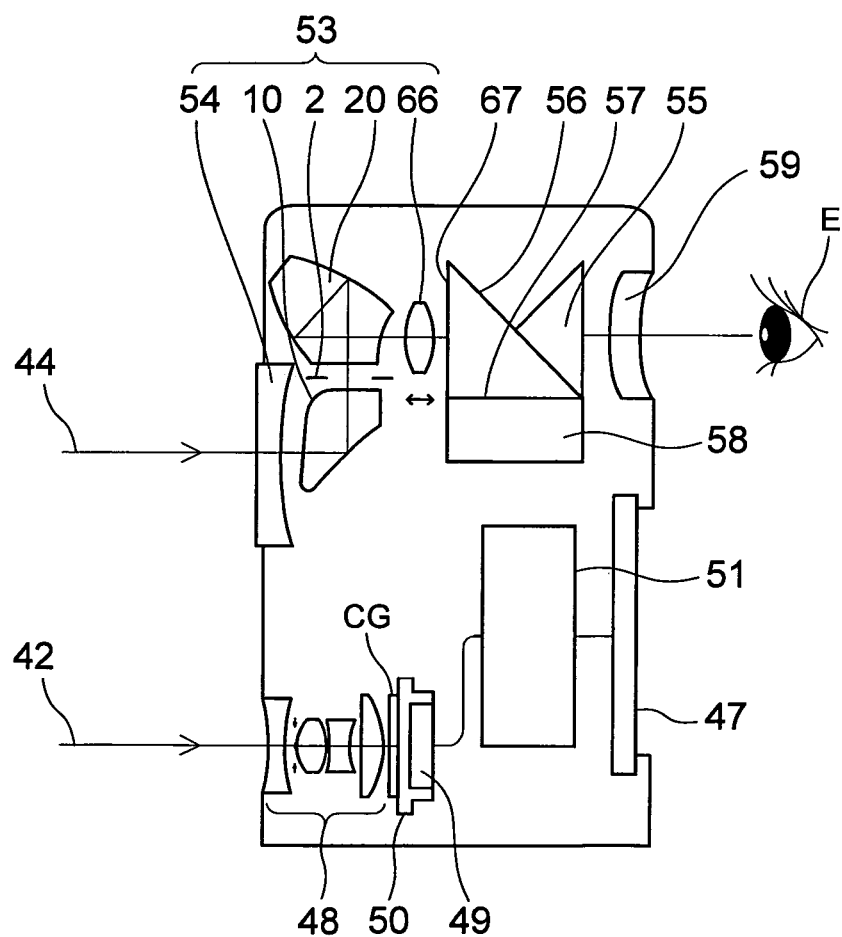
FIG. 17 is a cross sectional view showing the optical construction of the digital camera 40.

In FIG. 15 to FIG. 17 show conceptual diagrams of structures in which the image forming optical system according to the present invention is incorporated in a photographic optical system 41 of a digital camera. FIG. 15 is a frontward perspective view showing an appearance of a digital camera 40, FIG. 16 is a rearward perspective view of the same, and FIG. 17 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

In the digital camera 40 having the above-described configuration, an electronic image pickup apparatus equipped with a small and slim zoom lens having a decreased number of lenses in the image pickup optical system 41 is embodied. The present invention can be applied not only to digital cameras having a collapsible lens as described above but also digital cameras having a folded optical system.

Figure 18:
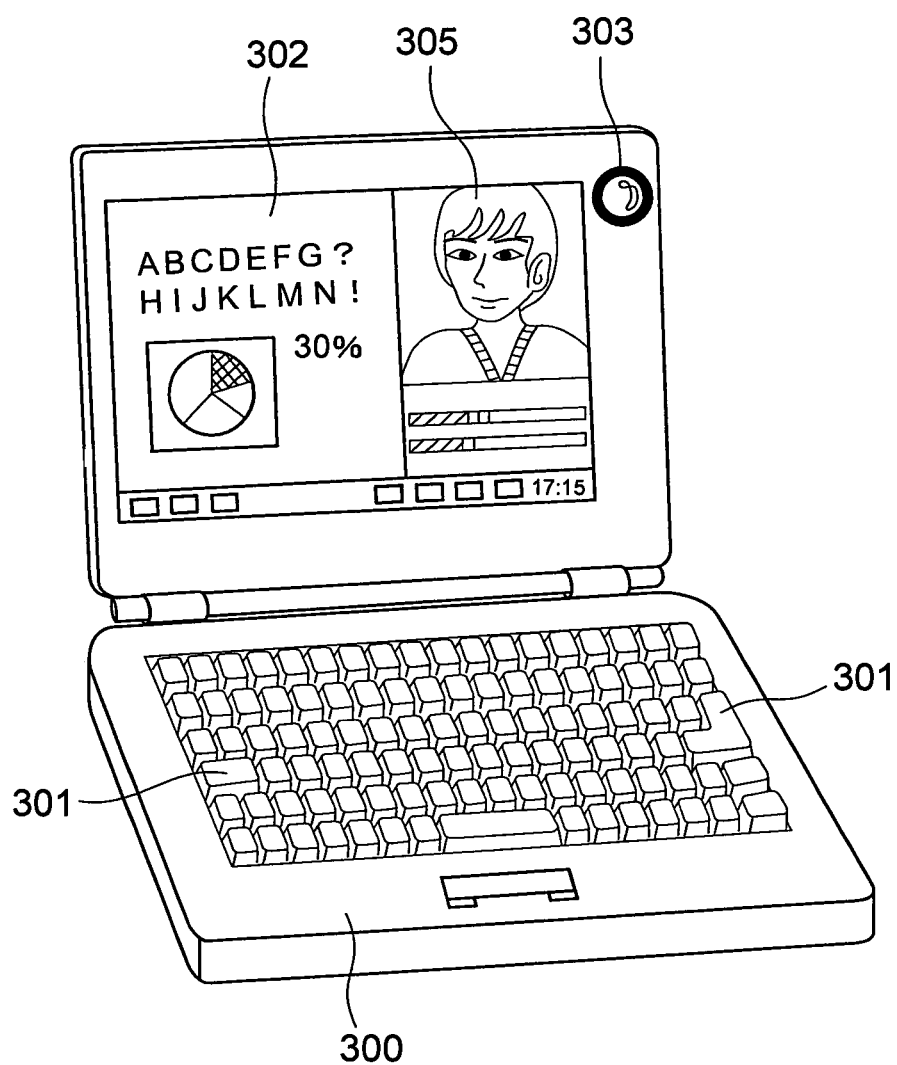
FIG. 18 is a front perspective view showing a personal computer 300 as an example of an information processing apparatus in which a zoom optical system according to the present invention is provided as an objective optical system, in a state in which the cover is open.
Figure 19:
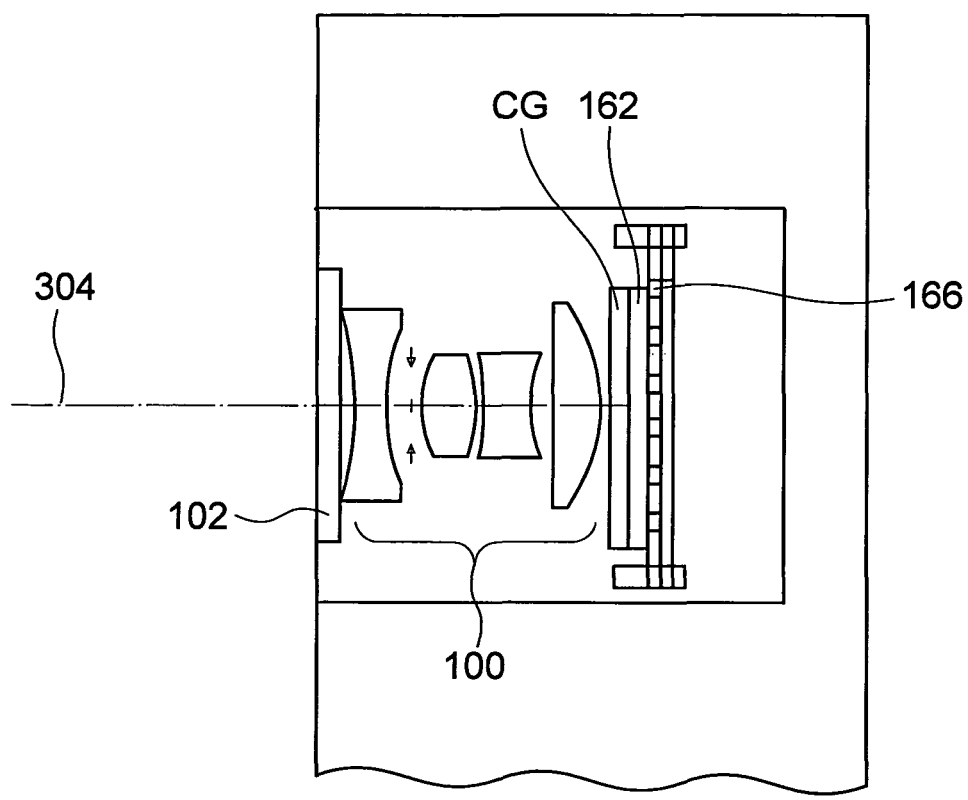
FIG. 19 is a cross sectional view of a taking optical system 303 of the personal computer 300.
Figure 20:
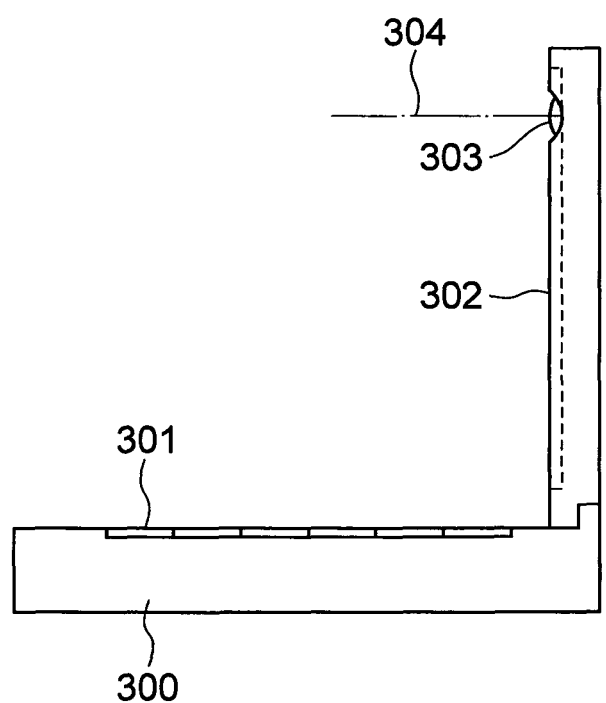
FIG. 20 is a side view of the personal computer 300.

Next, a personal computer which is an example of an information processing apparatus with a built-in image forming system as an objective optical system is shown in FIG. 18 to FIG. 20. FIG. 18 is a frontward perspective view of a personal computer 300 with its cover opened, FIG. 19 is a cross-sectional view of a photographic optical system 303 of the personal computer 300, and FIG. 20 is a side view of FIG. 18. As it is shown in FIG. 18 to FIG. 20, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 18, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 21A:
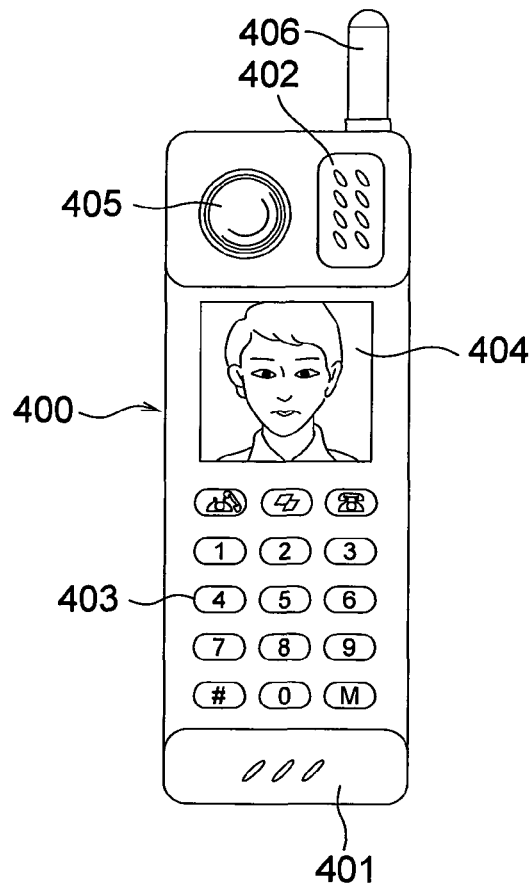
FIGS. 21A, 21B, and 21C show a cellular phone 400 as an example of an information processing apparatus in which a zoom optical system according to the present invention is provided as a taking optical system, where
Figure 21B:
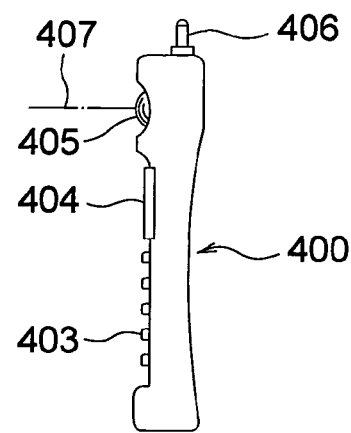
Figure 21C:
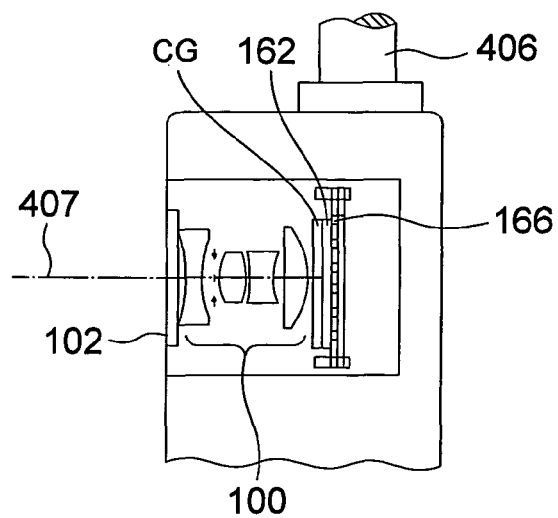

Next, a telephone which is an example of an information processing apparatus in which the image forming optical system of the present invention is built-in as a photographic optical system, particularly a portable telephone which is easy to carry is shown in FIG. 21A, FIG. 21B, and FIG. 21C. FIG. 21A is a front view of a portable telephone 400, FIG. 21B is a side view of the portable telephone 400, and FIG. 21C is a cross-sectional view of a photographic optical system 405. As shown in FIG. 83A to FIG. 83C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

What is claimed is:

1. An image forming optical system comprising:
  a lens group I located closest to its object side;
  an aperture stop;
  a lens group A disposed between the lens group I and the aperture stop and having a negative refracting power as a whole, wherein the lens group A includes a cemented lens component made up of a positive lens LA and a negative lens LB that are cemented together, the distance between the lens group I and the lens group A on the optical axis changes for the purpose of zooming, the cemented lens component has an aspheric cemented surface, and when the shape of the aspheric surface is expressed by the following equation (1) with a coordinate axis z taken along the optical axis and a coordinate axis h taken along a direction perpendicular to the optical axis:

$$z = h^2/[r[1+\{1-(1+k)(h/r)^2\}^{1/2}]] + A_4 h^4 + A_6 h^6 + A_8 h^8 + A_{10} h^{10} + \quad (1),$$

where r is the radius of curvature of a spherical component on the optical axis, k is a conic constant, $A_4, A_6, A_8, A_{10}, \ldots$ are aspheric coefficients, and a deviation is expressed by the following equation (2):

$$\Delta z = z - h^2/[r[1+\{1-(h/r)^2\}^{1/2}]] \quad (2),$$

the following conditional expression (3a) or (3b) is satisfied:

when $R_c \geq 0$, $$\Delta z_C(h) \leq (\Delta z_A(h) + \Delta z_B(h))/2 \text{(where } h=1.2a\text{)} \quad (3a),$$

when $R_c \leq 0$, $$\Delta z_C(h) \geq (\Delta z_A(h) + \Delta z_B(h))/2 \text{(where } h=1.2a\text{)} \quad (3b),$$

where $z_A$ expresses the shape of the air-contact surface of the positive lens LA according to equation (1), $z_B$ expresses the shape of the air-contact surface of the negative lens LB according to equation (1), $z_c$ expresses the shape of the cemented surface according to equation (1), $\Delta z_A$ is the deviation of the air-contact surface of the positive lens LA according to equation (2), $\Delta z_B$ is the deviation of the air-contact surface of the negative lens LB according to equation (2), $\Delta z_c$ is the deviation of the cemented surface according to equation (2), $R_c$ is the paraxial radius of curvature of the cemented surface, and a is a value expressed by the following equation (4):

$$a = y_{10}^2 \cdot \log_{10} \gamma / fw \quad (4),$$

where $y_{10}$ is the largest image height, fw is the focal length of the entire image forming optical system at the wide angle end, and γ is the zoom ratio (i.e. {the focal length of the entire system at the telephoto end}/{the focal length of the entire system at the wide angle end}) of the image forming optical system, where z(0)=0 holds for all the surfaces because the point of origin is set at the vertex of each surface.

2. The image forming optical system according to claim 1, wherein the value of θgF and the value of vd of the positive lens LA fall within the following two ranges: the range in an orthogonal coordinate system having a horizontal axis representing vd and a vertical axis representing θgF that is bounded by the straight line given by the equation θgF=α×vd+β (where α=−0.00163) into which the lowest value of β in the range defined by the following conditional expression (5) is substituted and the straight line given by the equation θgF=α×vd+β (where αhg1=−0.00163) into which the highest value of β in the range defined by the following conditional expression (5) is substituted; and the range defined by the following conditional expression (6):

$$0.6700 < \beta < 0.9000 \quad (5),$$

$$3 < vd < 27 \quad (6),$$

where θgF is the relative partial dispersion (ng−nF)/(nF−nC) of the positive lens LA, and vd is the Abbe constant (nd−1)/(nF−nC) of the positive lens LA, where nd, nC, nF, and ng are refractive indices of the positive lens LA for the d-line, C-line, F-line, and g-line respectively.

3. The image forming optical system according to claim 1, wherein the value of θhg and the value of vd of the positive lens LA fall within the following two ranges: the range in an orthogonal coordinate system having a horizontal axis representing vd and a vertical axis representing θhg that is bounded by the straight line given by the equation θhg=αhg×vd+βhg (where αhg=−0.00225) into which the lowest value of βhg in the range defined by the following conditional expression (7) is substituted and the straight line given by the equation θhg=αhg×vd+βhg (where αhg=−0.00225) into which the highest value of βhg in the range defined by the following conditional expression (7) is substituted; and the range defined by the following conditional expression (6):

$$0.6350 < \beta hg < 0.9500 \quad (7),$$

$$3 < vd < 27 \quad (6),$$

where θhg is the relative partial dispersion (nh−ng)/(nF−nC) of the positive lens LA, and nh is the refractive index of the lens LA for the h-line.

4. The image forming optical system according to claim 1, wherein the image forming optical system satisfies the following conditional expression (8):

$$0.0700 \leq \theta gF(LA) - \theta gF(LB) \leq 0.5000 \quad (8),$$

where θgF(LA) is the relative partial dispersion (ng−nF)/(nF−nC) of the positive lens LA, and θgF(LB) is the relative partial dispersion (ng−nF)/(nF−nC) of the negative lens LB.

5. The image forming optical system according to claim 1, wherein the image forming optical system satisfies the following conditional expression (9):

$$0.1000 \leq \theta hg(LA) - \theta hg(LB) \leq 0.60 \quad (9),$$

where θhg(LA) is the relative partial dispersion (nh−ng)/(nF−nC) of the positive lens LA, and θhg(LB) is the relative partial dispersion (nh−ng)/(nF−nC) of the negative lens LB.

6. The image forming optical system according to claim 1, wherein the image forming optical system satisfies the following conditional expression (10):

$$vd(LA) - vd(LB) \leq -16 \quad (10),$$

where vd (LA) is the Abbe constant (nd−1)/(nF−nC) of the positive lens LA, and vd (LB) is the Abbe constant (nd−1)/(nF−nC) of the negative lens LB.

7. The image forming optical system according to claim 1, wherein the image forming optical system satisfies the following conditional expression (11):

$$1.55 \leq nd(LA) \leq 1.90 \quad (11),$$

where nd(LA) is the refractive index of the positive lens LA for the d-line.

8. The image forming optical system according to claim 1, wherein the material of the positive lens LA is an energy curable resin, and the cemented lens component is produced by attaching the resin onto an optical surface of the negative lens LB and thereafter curing it to form the lens LA.

9. The image forming optical system according to claim 1, wherein the lens component that is located closest to the object side in the lens group A is the cemented lens component having a negative refracting power, and at least one positive lens is provided on the image side of this lens component.

10. The image forming optical system according to claim 1, wherein the lens component that is located closest to the object side in the lens group A is a negative single lens, and the cemented lens component is disposed on its image side.

11. The image forming optical system according to claim 1, wherein the lens component that is located closest to the image side in the lens group A is the cemented lens component having a negative refracting power.

12. The image forming optical system according to claim 1, wherein the image forming optical system consists of four lens groups including, in order from its object side, the lens group I, the lens group A, a lens group G3 having a positive refracting power, and a lens group G4 having a positive refracting power.

13. The image forming optical system according to claim 1, wherein the image forming optical system consists of four lens groups including, in order from its object side, the lens group I, the lens group A, a lens group G3 having a negative refracting power, and a lens group G4 having a positive refracting power.

14. The image forming optical system according to claim 1, wherein the image forming optical system consists of four lens groups including, in order from its object side, the lens group I, the lens group. A, a lens group G3 having a positive refracting power, and a lens group G4 having a negative refracting power.

15. The image forming optical system according to claim 1, wherein the image forming optical system consists of five lens groups including, in order from its object side, the lens group I, the lens group A, a lens group G3 having a positive refracting power, a lens group G4 having a positive refracting power, and a lens group G5 having a negative refracting power.

16. The image forming optical system according to claim 1, wherein the image forming optical system consists of five lens groups including, in order from its object side, the lens group I, the lens group A, a lens group G3 having a positive refracting power, a lens group G4 having a negative refracting power, and a lens group G5 having a positive refracting power.

17. The image forming optical system according to claim 1, wherein the image forming optical system consists of five lens groups including, in order from its object side, the lens group I, the lens group A, a lens group G3 having a positive refracting power, a lens group G4 having a positive refracting power, and a lens group G5 having a positive refracting power.

18. The image forming optical system according to claim 1, wherein the lens group I has a reflecting optical element.

19. An electronic image pickup apparatus comprising:
an image forming optical system as recited in claim 1;
an electronic image pickup element; and
an image processing unit that processes image data obtained by picking up an image formed through the image forming optical system by the electronic image pickup element and outputs image data representing an image having a changed shape, wherein
the image forming optical system is a zoom lens, and
the zoom lens satisfies the following conditional expression (17) when the zoom lens is focused on an object point at infinity:

$$0.70 < y_{07}/(f_W \cdot \tan \omega_{07w}) < 0.96 \qquad (17),$$

where $y_{07}$ is expressed by equation $y_{07} = 0.7 y_{10}$, $y_{10}$ being a distance from the center of an effective image pickup area (i.e. an area in which images can be picked up) of the electronic image pickup element to a point farthest from the center within the effective image pickup area (or a largest image height), $\omega_{07w}$ is the angle of the direction toward an object point corresponding to an image point formed at a position at distance $y_{07}$ from the center of the image pickup surface at the wide angle end with respect to the optical axis, and fw is the focal length of the entire image forming optical system at the wide angle end.

* * * * *